(12) United States Patent
Oketani et al.

(10) Patent No.: US 8,548,008 B2
(45) Date of Patent: Oct. 1, 2013

(54) SINGLE CARRIER TRANSMISSION SYSTEM, COMMUNICATION DEVICE, AND SINGLE CARRIER TRANSMISSION METHOD USING FOR THEM

(75) Inventors: Kengo Oketani, Tokyo (JP); Yoshikazu Kakura, Tokyo (JP); Toshifumi Sato, Tokyo (JP); Shousei Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 986 days.

(21) Appl. No.: 12/278,694

(22) PCT Filed: Feb. 7, 2007

(86) PCT No.: PCT/JP2007/052108
§ 371 (c)(1),
(2), (4) Date: Aug. 7, 2008

(87) PCT Pub. No.: WO2007/091590
PCT Pub. Date: Aug. 16, 2007

(65) Prior Publication Data
US 2009/0052427 A1    Feb. 26, 2009

(30) Foreign Application Priority Data

Feb. 8, 2006  (JP) ................................. 2006-030401
Feb. 5, 2007  (JP) ................................. 2007-025683

(51) Int. Cl.
*H04L 12/40* (2006.01)

(52) U.S. Cl.
USPC ............ 370/485; 370/480; 370/464; 370/298

(58) Field of Classification Search
None
See application file for complete search history.

(56) References Cited

U.S. PATENT DOCUMENTS

| | | | | |
|---|---|---|---|---|
| 5,495,432 A | * | 2/1996 | Ho ................................. | 708/313 |
| 6,154,659 A | * | 11/2000 | Jalali et al. ..................... | 455/522 |
| 2003/0169824 A1 | * | 9/2003 | Chayat ........................... | 375/260 |
| 2004/0131105 A1 | * | 7/2004 | Kegasa et al. ................. | 375/130 |
| 2005/0002444 A1 | * | 1/2005 | Wei et al. ....................... | 375/147 |
| 2005/0094550 A1 | * | 5/2005 | Huh et al. ...................... | 370/203 |

(Continued)

FOREIGN PATENT DOCUMENTS

| | | |
|---|---|---|
| CN | 1574823 A | 2/2005 |
| JP | 09-261129 A | 10/1997 |

(Continued)

OTHER PUBLICATIONS

"Pilot Structure for SC-FDMA" 3GPP TSG RAN WG1 Meeting #42, 10.3 Further Discussion on SC-FDMA/OFDMA for FDD Uplink, Aug. 29-Sep. 2, 2005, pp. 1-5, ETRI, London, UK.

(Continued)

*Primary Examiner* — Hassan Phillips
*Assistant Examiner* — Anez Ebrahim
(74) *Attorney, Agent, or Firm* — Sughrue Mion, PLLC

(57) ABSTRACT

A memory 21 of a pilot processing circuit 2 holds in advance a pilot sequence converted into a frequency region signal obtained by subjecting a pilot signal symbol transmitted in one block to Ntx_p-point DFT. The pilot sequence held in the memory 21 is subjected to a series of processes including a roll-off filtering by a roll-off filter circuit 22, subcarrier mapping process by subcarrier mapping circuit 23, an Ndft_p-point IDFT operation by an IDFT circuit 24, and a cyclic prefix adding process by a cyclic prefix adding circuit 25.

10 Claims, 23 Drawing Sheets

(56) References Cited

U.S. PATENT DOCUMENTS

| | | |
|---|---|---|
| 2005/0226140 A1 | 10/2005 | Zhuang et al. |
| 2006/0002582 A1* | 1/2006 | Suehiro et al. ................ 382/100 |
| 2007/0036231 A1* | 2/2007 | Ido ................................ 375/260 |
| 2007/0041311 A1* | 2/2007 | Baum et al. ................... 370/208 |
| 2007/0165588 A1* | 7/2007 | McCoy .......................... 370/344 |

FOREIGN PATENT DOCUMENTS

| | | |
|---|---|---|
| JP | 11-284597 A | 10/1999 |
| JP | 2003-101503 A | 4/2003 |
| JP | 2003-158499 A | 5/2003 |
| JP | 2004-260774 A | 9/2004 |
| JP | 2005-295429 A | 10/2005 |
| JP | 2006-014324 A | 1/2006 |
| WO | 02/41548 A1 | 5/2002 |

OTHER PUBLICATIONS

"Uplink Pilot for SC-FDMA" 3GPP TSG RAN WG1#42bis, 8.2, Oct. 10-14, 2005, pp. 1-5, Huawei, San Diego, US.

"Text Proposal on Uplink Reference Signal Structure" 3GPP TSG-RAN WG1 LTE Meeting, 13.2.2.2, Jan. 13-17, 2006, pp. 1-4, Texas Instruments, Denver, USA.

"Considerations on Uplink Pilot Design Using CAZAC" TSG-RAN WG1 Meeting #44, 13.2.2.2, Feb. 13-17, 2006, pp. 1-5, NEC Group, Denver, USA.

"Considerations on Uplink Pilot Design Using CAZAC" 3GPP TSG RAN WG1 Meeting #44bis, 10.2.1, Mar. 27-31, 2006, pp. 1-5, NEC Group, Athens, Greece.

3rd Generation Partnership Project; Technical Specification Group Radio Access Network; Physical Layer Aspects for Evolved UTRA (Release 7); 3GPP TR 25.814 Vo.5.0 (Nov. 2005); pp. 1-11.

Orthogonal Pilot Channel Structure in E-UTRA Uplink; NTT DoCoMo, NEC, Sharp; 3GPP TSG-RAN WG1 LTE Ad Hoc Meeting; Jan. 23-25, 2006; pp. 1-8.

EUTRA SC-FDMA Uplink Resource Block, Resource Allocation and Pilot/Reference Signal Design & TP; Motorola; 3GPP TSG RAN1 LTE Ad Hoc Jan. 23-25, 2006; Helsinki, Finland; pp. 1-18.

Considerations on uplink pilot design using CAZAC;' NEC Group; TSG-RAN WG1 LTE Ad hoc; Jan. 23-25, 2006; pp. 1-2.

Physical Channels and Multiplexing in Evolved UTRA Uplink; NTTDoCoMo, Fujitsu, NEC, Sharp; 3GPP TSG RAN WG1 #42 on LTE; London, U.K.; Aug. 29-Sep. 2, 2005; pp. 1-14.

Pilot Sequence Allocation Method in E-UTRA Uplink; NTT DoCoMo, Mitsubishi Electric, Panasonic, Sharp, Toshiba Corporation; 3GPP TSG RAN WG1 Meeting #46 062103; Talin, Estonia; Aug. 28-Sep. 1, 2006; pp. 1-6.

Uplink reference signal structure and allocaion for E-UTRA; Panasonic, NTT DoCoMo; TSG-RAN WG1 Meeting #47bis; Sorrento, Italy; Jan. 15-19, 2007; pp. 1-6.

Sounding Reference Signal Assignments in E-ITRA Uplink; Texas Instruments; 3GPP TSG RAN WG1#47bis; Sorrento, Italy; Jan. 15-19, 2007; pp. 1-6.

Multi-Carrier and Spread Spectrum Systems; K. Fazel, et al.; (3 pages).

Freescale Semiconductor, "Considerations on SC-FDMA Pilot Design [online]", 3GPP TSG-RAN WG1#43 R1-051557, Internet <URL: http://www.3gpb.org/ftp/tsg ran/WG1 RL1/TSGR1 43/Does/R1-051557.zip> Seoul, Korea, Nov. 2005, pp. 1-5.

NEC Group, "Considerations on uplink pilot design using CAZAC sequences [online]", 3GPP TSG-RAN WG1#45 R1-061311, Internet<URL: http://www.3gpp.org/ftp/tsg ran/WG1 RL1/TSGR1 45/Docs/R1-061311.zip> Shanghai, China, May 2006, pp. 1-5.

Communication from the Japanese Patent Office dated Aug. 14, 2012, in a counterpart application No. 2010-283120.

Communication from the European Patent Office issued Jun. 28, 2013 in counterpart European Application No. 13150285.8.

* cited by examiner

Fig. 6
(a) DATA
Ntx_d=128
ROLL-OFF FACTOR =0.22
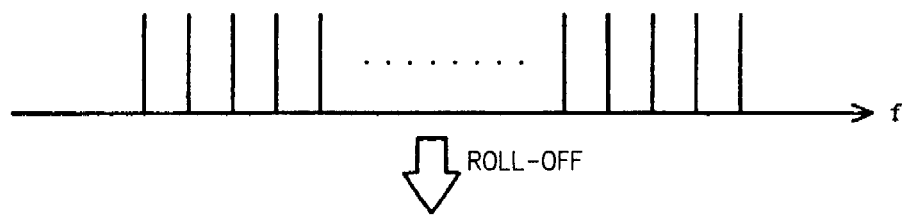
(b) PILOT
Ntx_d=61
ROLL-OFF FACTOR=0.28
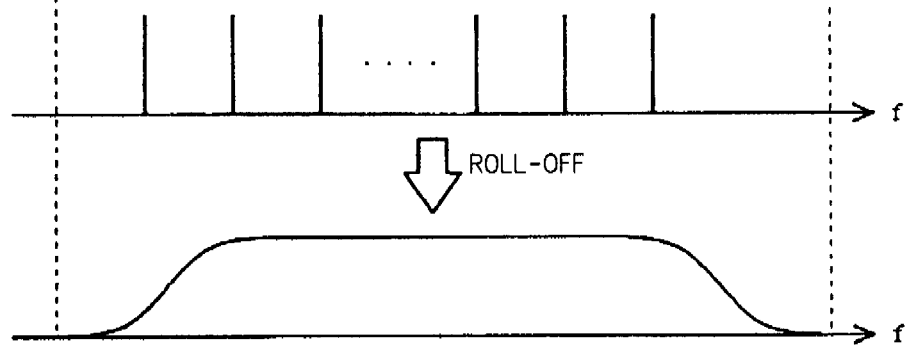

Fig. 14

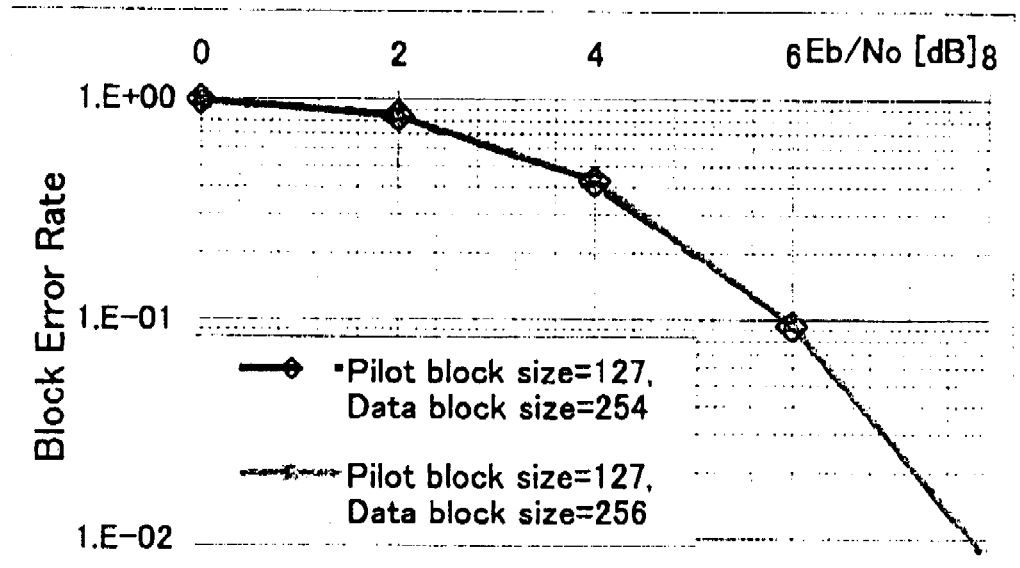

|  | 0 | 2 | 4 | 6 | 8 |
|---|---|---|---|---|---|
| Pilot block | 9.88E-01 | 8.41E-01 | 4.27E-01 | 9.38E-02 | 8.40E-03 |
| Pilot block | 9.88E-01 | 8.40E-01 | 4.31E-01 | 9.57E-02 | 8.40E-03 |

Fig. 15

| Transmission Bandwidth | 5 MHz |
|---|---|
| Channel Estimation | Real |
| Modulation | 16QAM |
| Pulse shaping roll-off factor | 0.15 |
| Pilot / Data power | 0 dB |
| sub-frame format | 25.814 v0.5.0 Table 9.1.1-1 '5MHz' case |
| FEC | Rate ½ Turbo encoding |
| Channel | TU with 6 paths, type (1) (Document[5]) |
| Doppler rate | 5.56 Hz (3 km/h @ 2.0 GHz) |
| Number of receive antennas | 2 |
| TTI duration | 0.5 ms |
| Transport Block Size (including CRC), bits | 3068 [bit] |

Fig. 19

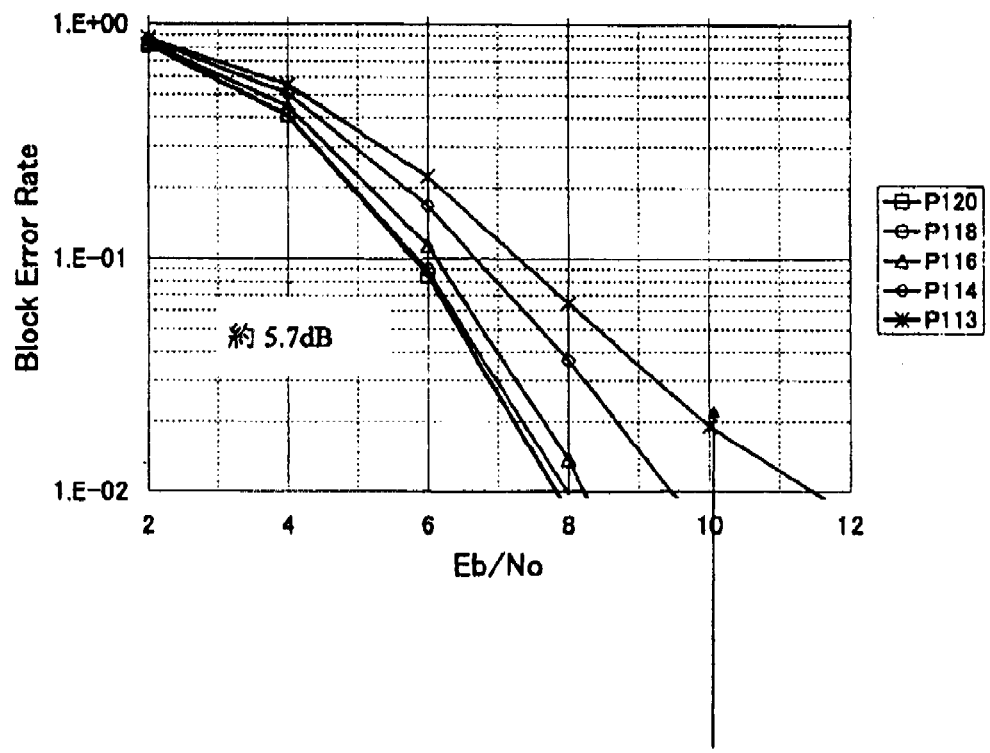

Fig. 20

| Transmission Bandwidth | 3.6 MHz (the number of subcarriers of Data CH:240) |
|---|---|
| Channel Estimation | Real |
| Modulation | 16QAM |
| sub-frame format | Figure9.1.1-4 of 25.814v7.1.0 and the item described Table 9.1.1-1 '5MHz' case |
| FEC | Rate ½ Turbo encoding |
| Channel model | TU with 6 paths, type (1) (from 3GPP TS 45.005 V5.4.0 (2002-06)) |
| Doppler rate | 5.56 Hz (3 km/h @ 2.0 GHz) |
| Number of receive antennas | 2 |
| TTI duration | 0.5 ms |
| Transport Block Size (including CRC) | 2876 bits |
| Data Multiplexing | Localized FDM |

Fig. 21

$R_{diff} = 4$, $P_{min} = 11$ (Data : Reference = 2:1)

| Data | 12 | 24 | 36 | 48 | 60 | 72 | 84 | 96 | 108 | 120 | 132 | 144 | 156 | 168 | 180 | 192 | 204 | 216 | 228 | 240 | 252 | 264 | 276 | 288 | 300 |
|---|---|---|---|---|---|---|---|---|---|---|---|---|---|---|---|---|---|---|---|---|---|---|---|---|---|
| Reference | 5 | 11 | 17 | 21 | 29 | 33 | 41 | 47 | 53 | 59 | 66 | 71 | 78 | 83 | 89 | 95 | 101 | 107 | 113 | 119 | 123 | 131 | 137 | 143 | 149 |

Fig. 22

Rdiff = 3, Pmin = 11 (Data : Reference = 1:1)

| Data | 12 | 24 | 36 | 48 | 60 | 72 | 84 | 96 | 108 | 120 | 132 | 144 | 156 | 168 | 180 | 192 | 204 | 216 | 228 | 240 | 252 | 264 | 276 | 288 | 300 |
|---|---|---|---|---|---|---|---|---|---|---|---|---|---|---|---|---|---|---|---|---|---|---|---|---|---|
| Reference | 11 | 23 | 35 | 47 | 59 | 71 | 83 | 95 | 107 | 119 | 131 | 143 | 155 | 167 | 179 | 191 | 203 | 215 | 227 | 239 | 251 | 263 | 275 | 287 | 299 |

SINGLE CARRIER TRANSMISSION SYSTEM, COMMUNICATION DEVICE, AND SINGLE CARRIER TRANSMISSION METHOD USING FOR THEM

TECHNICAL FIELD

The present invention relates to a transmission system, a communication device, and a transmission method for use therein, and more particularly a single carrier transmission method for use in a wireless access process.

BACKGROUND ART

A single carrier transmission process has widely been accepted as an uplink wireless access process beyond 3G (third generation). The single carrier transmission process is described in Non-patent Document 1 (Physical Layer Aspects for Evolved UTRA" (3GPP TR25.814v0.5.0 (2005-11), Chapter 9.1)), for example. FIG. 2 shows the arrangement of a transmitter according to the single carrier transmission process proposed in Non-patent Document 1, and FIG. 3 shows the arrangement of a general receiver compatible with the transmitter. A summary of operation of the transmitter and the receiver of the background art will be described below with reference to FIGS. 2 and 3.

First, data processing circuit 110 and pilot processing circuit 120 of the transmitter will be described below with reference to FIG. 2.

In data processing circuit 110, DFT (Discrete Fourier Transformation) (converting a time-domain signal into a frequency-domain signal) circuit 111 performs an Ntx_d point DFT computation on a data signal, thereby converting the data signal into a frequency-domain signal. The data signal is delimited to a data block size (=the number of subcarriers before the data signal passes through a transmission filter=Ntx_d) in which coded data symbols are transmitted as one block, and comprises Ntx_d symbols.

Roll-off filter circuit 112 performs a roll-off filtering process on the frequency-domain data signal in the frequency domain. Subcarrier mapping circuit 113 maps the data signal that has passed through roll-off filter circuit 112 onto subcarriers (specified for respective users). "0" is inserted into subcarriers that are not specified for respective users. Subcarrier mapping circuit 113 generates a data signal having a total of Ndft_d symbols.

IDFT (Inverse Discrete Fourier Transformation) (converting a frequency-domain signal into a time-domain signal) circuit 114 performs an Ndft_d point IDFT computation on the subcarrier-mapped data signal (signal comprising Ndft_d subcarriers), thereby converting the data signal back into a time-domain signal described Cyclic prefix adding circuit 115 adds a cyclic prefix to each of the IDFTed blocks. The cyclic prefix is added to allow the receiver to effectively carry out a frequency domain equalizing process. The addition of a cyclic prefix refers to a process of copying a rear portion of a block to a front portion of the block, as shown in FIG. 1.

Pilot processing circuit 120 will be described below.

In pilot processing circuit 120, DFT circuit 121 performs an Ntx_p point DFT computation on pilot signal symbols (the number of symbols=the number of subcarriers before a pilot signal passes through the transmission filter=the length of a pilot sequence=Ntx_p) transmitted as one block, thereby converting the pilot signal into a frequency-domain signal.

The processing operation of pilot processing circuit 120 subsequent to DFT circuit 121 is the same as the above processing operation on the data signal. Specifically, roll-off filter circuit 122 performs a roll-off filtering process on the frequency-domain pilot signal. Subcarrier mapping circuit 123 performs a subcarrier mapping process on the pilot signal after it is processed by roll-off filter circuit 122. IDFT circuit 124 performs an Ndft_p point IDFT computation on the subcarrier-mapped pilot signal (signal comprising Ndft_p subcarriers), thereby converting the pilot signal back into a time-domain signal. Cyclic prefix adding circuit 125 adds a cyclic prefix to each block of the IDFTed signal.

Time-division multiplexing circuit 130 time-division-multiplexes the data signal and the pilot signal to which the cyclic prefixes are added, and transmits the time-division-multiplexed signal to the receiver. According to Non-patent Document 1, Ntx_p Ntx_d/2.

Data processing circuit 150 and pilot processing circuit 160 of the receiver will be described below with reference to FIG. 3.

In the receiver, cyclic prefix removing/data pilot separating circuit 140 removes the cyclic prefixes from the received signal and demultiplexes the time-division-multiplexed signal to separate the received data part and the received pilot part from each other. Cyclic prefix removing/data pilot separating circuit 140 outputs the received data part to data processing circuit 150 and also outputs the received pilot part to pilot processing circuit 160.

In pilot processing circuit 160, DFT circuit 161 performs an Ndft_p point DFT computation on the received pilot part separated by cyclic prefix removing/data pilot separating circuit 140, thereby converting it into a received pilot signal in the frequency domain. Subcarrier demapping circuit 162 demaps the subcarriers of the received pilot signal in the frequency domain, thereby extracting only the subcarriers transmitted by the user. Roll-off filter circuit 163 performs a roll-off filtering process on the subcarrier-demapped received pilot signal. Propagation channel estimating circuit 164 estimates a propagation channel for each subcarrier, using the received pilot signal that has passed through roll-off filter circuit 163.

Frequency-domain equalizing circuit 165 performs a frequency-domain equalizing process (for equalizing subcarriers in the frequency domain by multiplying the subcarriers by respective weighting coefficients) on the received pilot signal, using the propagation channels estimated by propagation channel estimating circuit 164. IDFT circuit 166 performs an Ndft_p point IDFT computation on the received pilot signal that has passed through frequency-domain equalizing circuit 165, thereby converting the received pilot signal back into a received pilot signal in the time domain. Amplitude estimating circuit 167 estimates an amplitude of the time-domain received pilot signal. The estimated amplitude value is used to demodulate the received data signal.

The estimated amplitude value in the time domain is calculated according to the following equation (1):

[Equation 1]

$$\text{Estimated amplitude value in time domain} = \frac{1}{N_{tx\_p}} \sum_{n=0}^{N_{tx\_p}-1} a_n^* b_n \quad (1)$$

where $a_n$ (n=0, 1, ..., Ntx_p−1) represents a transmitted pilot sequence (time-domain), * a complex conjugate, and $b_n$ (n=0, 1, ..., Ntx_p−1) a value of the equalized received pilot sequence in the time domain.

In data processing circuit 150, as with the above processing operation on the pilot signal, DFT circuit 151 performs an Ndft_d point DFT computation on the received data part separated by cyclic prefix removing/data pilot separating circuit 140, thereby converting it into a received data signal in the frequency domain. Subcarrier demapping circuit 152 demaps the subcarriers of the received data signal in the frequency domain, retrieving only the subcarriers transmitted by the user. Roll-off filter circuit 153 performs a roll-off filtering process on the subcarrier-demapped received data signal. Frequency-domain equalizing circuit 154 performs a frequency-domain equalizing process on each of the subcarriers of the received data signal that has passed through roll-off filter circuit 153. IDFT circuit 155 performs an Ntx_d point IDFT computation on the received data signal that has passed through frequency-domain equalizing circuit 154, thereby converting the received data signal back into a received data signal in the time domain. Demodulating circuit 156 demodulates the received data signal in the time domain, which has been equalized in the frequency domain, using the estimated amplitude value obtained from pilot processing circuit 160.

For the above wireless transmission, multilevel modulation (QAM: Quadrature Amplitude Modulation) is performed for increasing the transmission efficiency. In a wireless propagation channel, a transmitted signal that is multilevel-modulated suffers amplitude fluctuation and phase rotation peculiar to the wireless propagation channel, called fading.

In order for the receiver to demodulate and decode the received signal properly, it is necessary to estimate these variations (estimated propagation channel values and estimated amplitude values) properly (see, for example, Japanese Patent Laid-Open No. 2004-260774). The frequency domain equalizing process and the demodulating process described above are of general nature.

Generally, the complexity of DFT and IDFT computations depends on the number of points in the DFT and IDFT computations. Specifically, if the number of points is represented by a power of 2 (2, 4, 8, . . . , 512, 1024, . . . ), then the complexity of the computations is minimum. Conversely, if the number of points is represented by a prime number or a number including a large prime number, then the complexity of the computations is large. In view of the amount of DFT and IDFT computations, therefore, the numbers of points Ndft_d (data) and Ndft_p (pilot) in the IDFT computations performed by the transmitter and the DFT computations performed by the receiver should desirably be set to powers of 2. According to Non-patent Document 1, for example, if the system bandwidth is of 5 MHz, then Ndft_d is set to Ndft_d 512 (=the ninth power of 2) and Ndft_p is set to Ndft_p=256 (=the eighth power of 2). If the relationship Ndft_p=Ndft_d/2 is satisfied, then it means that the subcarrier interval of the pilot signal is twice the subcarrier interval of the data signal.

According to Non-patent Document 1, since the subcarrier interval of the pilot signal is twice the subcarrier interval of the data signal, the data block size Ntx_d and the pilot block size Ntx_p are set to satisfy Ntx_p=Ntx_d/2.

For pilot signals, attention has been attracted to a Zadoff-Chu sequence which is one of "CAZAC (Constant Amplitude Zero AutoCorrelation) sequences".

A Zadoff-Chu sequence $c_k$ is expressed by the following equation (2):

[Equation 2]

$$c_k = \exp\left[-\frac{j2\pi k}{Ntx\_p}\left(n\frac{n+1}{2} + qn\right)\right] \quad (2)$$

In the equation (2), n represents 0, 1, . . . , Ntx_p−1, and q an arbitrary integer. The Zadoff-Chu sequence is described in detail in Non-patent Document 2 (K. Fazel and S. Keiser, "Multi-Carrier and Spread Spectrum Systems" (John Wiley and Sons, 2003)).

"CAZAC sequence" is a signal sequence which has a constant amplitude in the time domain and the frequency domain and whose periodic autocorrelation value is 0 with respect to time shifts other than 0. According to "CAZAC sequence", since its amplitude is constant in the time domain, PAPR (Peak to Average Power Ratio) can be reduced. Since the amplitude is constant also in the frequency domain, "CAZAC sequence" is a signal sequence which is suitable for the estimation of a propagation channel in the frequency domain. Reduced PAPR means a reduction in the power consumption, which is preferable particularly for mobile communications.

Furthermore, inasmuch as "CAZAC sequence" has perfect autocorrelation, it is advantageous in that allows the timing of a received signal to be detected with ease, and is drawing attention as a pilot sequence suitable for use in a single carrier transmission process as an uplink wireless access process beyond 3G.

If "CAZAC sequence" is used in the cellular environment, its cross-correlation is also of importance. For the purpose of suppressing interferential waves from other cells, it is desirable to assign a set of sequences of small cross-correlation values to a pilot signal between adjacent cells. The cross-correlation of "CAZAC sequence" greatly depends on its signal sequence. In other words, if the sequence length is represented by a prime number or a number including a large prime number, then the cross-correlation is very good (the cross-correlation value is small). Conversely, if the sequence length is represented by a composite number (e.g., a power of 2 or 3) made up of a small prime number only, the cross-correlation is greatly degraded (the cross-correlation value includes a large value).

Specifically, if the sequence length of "CAZAC sequence" is represented by a prime number, the cross-correlation value of arbitrary sequences is kept as $1/\sqrt{N}$ (N represents the sequence length and is currently represented by a prime number) at all times. Therefore, if the sequence length is N=127, for example, then the cross-correlation value is $1/\sqrt{127}$ at all time, and if the sequence length is N=128, the cross-correlation value has a worse value (maximum value) of $1/\sqrt{2}$. The number of symbols Ntx_p of a pilot signal should desirably be represented by a prime number or a number including a large prime number, but not a composite number made up of a small prime number only, such as 2, 3, 5, or the like.

If a pilot signal has a signal sequence having the characteristics of the Zadoff-Chu sequence and a prime number or a number including a large prime number is selected to represent the number of symbols thereof in order to reduce the cross-correlation of pilot signals, then the complexity of the DFT computation carried out by a transmitter for the pilot signal and the complexity of the IDFT computation carried out by a receiver for the pilot signal are very large. The complexity of the process performed by at least one of the transmitter and the receiver is thus increased. This is because, as described above, the complexities of DFT and IDFT computations are generally very large if the number of points is represented by a prime number or a number including a large prime number.

SUMMARY

An exemplary object of the invention is to provide a single carrier transmission system, a communication device, and a single carrier transmission method for use therein which are capable of reducing the cross-correlation of pilot signals and reducing the complexity of a process performed by at least one of a transmitter and a receiver.

Another object of the invention is to provide a single carrier transmission system, a communication device, and a single carrier transmission method for use therein which are capable of reducing the cross-correlation of pilot signals and reducing the complexities of DFT and IDFT computations.

Still another object of the invention is to provide a single carrier transmission system, a communication device, and a single carrier transmission method for use therein which are capable of simply reducing the complexity of a process performed by at least one of a transmitter and a receiver.

Yet another object of the invention is to provide a single carrier transmission system, a communication device, and a single carrier transmission method for use therein which are capable of simply reducing the complexities of DFT and IDFT computations.

To achieve the above objects, in accordance with an exemplary aspect of the invention, a transmitter independently sets a data block size of a data signal and a pilot block size of a pilot signal. A receiver estimates an estimated amplitude value used to demodulate the data signal based on a sequence in a frequency domain of the pilot signal.

With above arrangement, the cross-correlation of the pilot signal can be reduced, and the computational complexity of at least one of a DFT computation performed by the transmitter and an IDFT computation performed by the receiver can be reduced regardless of the value of a pilot sequence length Ntx_p. Even if a prime number is selected as the pilot sequence length Ntx_p, for example, the computational complexities of the DFT computation performed by the transmitter and the IDFT computation performed by the receiver can be reduced.

BRIEF DESCRIPTION OF THE DRAWINGS

FIG. 6 is a block diagram showing the configuration of a first exemplary embodiment of a receiver shown in FIG. 4;

FIG. 14 is a graph showing advantages according to the other exemplary embodiments of the present invention;

FIG. 15 is a table showing parameters used in the simulation of the graph shown in FIG. 14;

FIG. 19 is a graph showing the results of a simulation of the fourth exemplary embodiment;

FIG. 20 is a table showing parameters used in the simulation of the graph shown in FIG. 19;

FIG. 21 is a table showing an example of pilot block sizes with respect to data block sizes according to the fourth exemplary embodiment of the present invention;

FIG. 22 is a table showing another example of pilot block sizes with respect to data block sizes according to the fourth exemplary embodiment of the present invention;

EXEMPLARY EMBODIMENT

Figure 4:
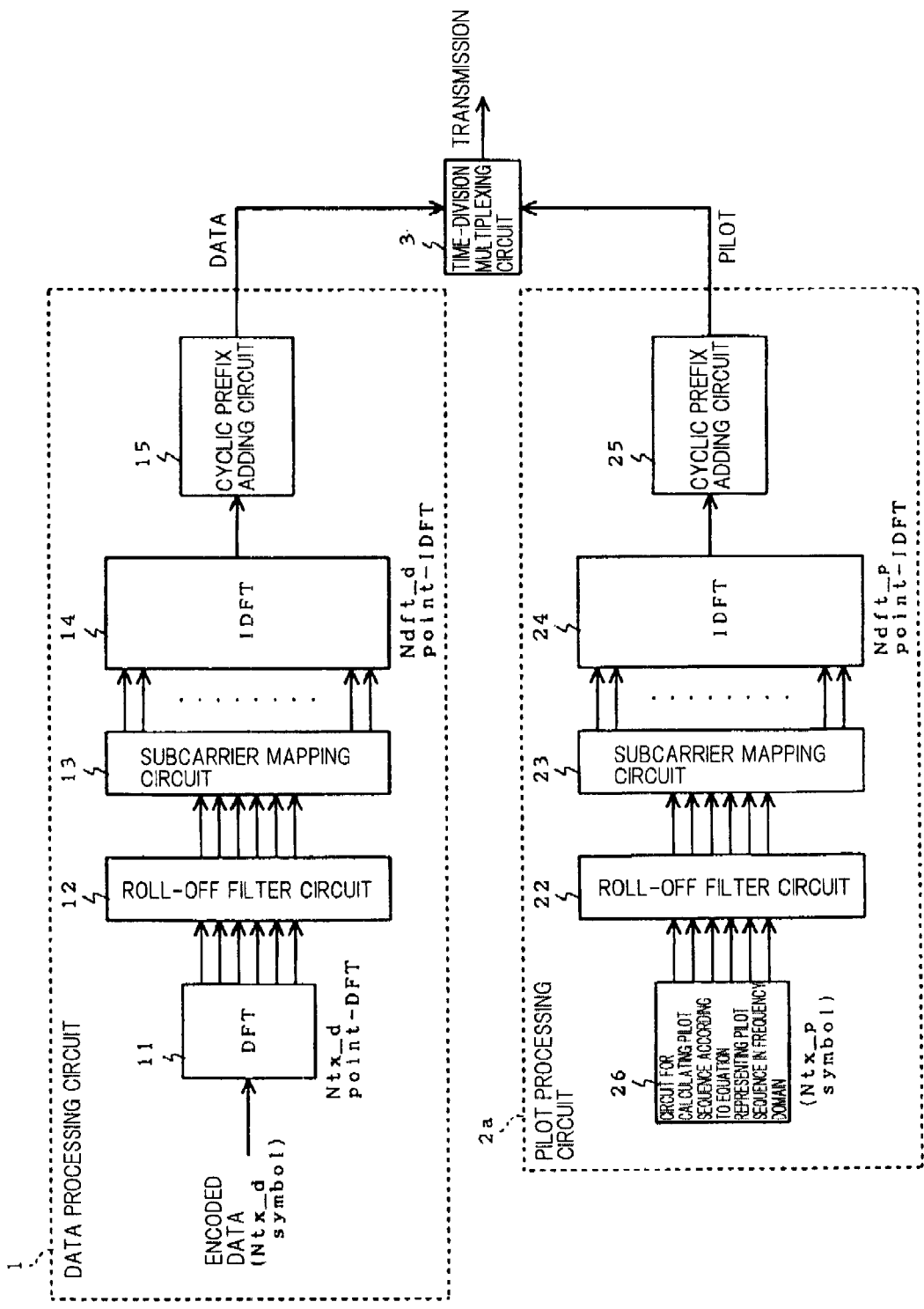
FIG. 4 is a block diagram showing an example of configuration of a single carrier transmission system according to the present invention.

FIG. 4 is a block diagram showing an example of configuration of a single carrier transmission system according to the present invention.

As shown in FIG. 4, the single carrier transmission system according to the present invention is of a configuration comprising transmitter 101 and receiver 102.

The single carrier transmission system according to the present invention eliminates conditions regarding a data block size and a pilot block size which have been required by the background art, e.g., "Ntx_p=Ntx_d/2". In order to reduce the complexity of the DFT computation performed on the data signal by the transmitter and the complexity of the IDFT computation performed on the data signal by the receiver, data block size Ntx_d is set to the number of points in the DFT computation or the IDFT computation (e.g., Ntx_d=256=the eighth power of 2).

The single carrier transmission system according to the present invention employs a signal sequence having characteristics such as of the Zadoff-Chu sequence (see Non-patent Document 2) for pilot block size Ntx_p.

This signal sequence is set to a prime number or a number including a large prime number for obtaining a low cross-correlation value. However, if only data block size Ntx_d and pilot block size Ntx_p are set, since Ntx_p represents a prime number or a number including a large prime number, the complexity of the DFT computation performed on the pilot signal by the transmitter and the complexity of the IDFT computation performed on the pilot signal by the receiver are increased. This is because Ntx_p represents a prime number or a number including a large prime number. This problem can be solved by completely eliminating the DFT computation and the IDFT computation which have been required on the pilot signal by the transmitter and the receiver according to the background art.

Specifically, the DFT computation performed on the pilot signal by the transmitter and the IDFT computation performed on the pilot signal by the receiver can be eliminated by methods described below.

First, a method of solving the problem in the transmitter, i.e., a method of eliminating the DFT computation performed on the pilot signal by the transmitter, will be described below.

The single carrier transmission system according to the present invention calculates in advance a sequence of a DFTed pilot signal (a pilot sequence in the frequency domain), and stores the calculated sequence in a memory or the like. It is thus not necessary for the transmitter to perform the DFT computation on the pilot signal. It is possible to prepare a pilot sequence in the frequency domain in advance because the pilot signal is a known sequence.

If a sequence of a DFTed pilot signal can explicitly expressed by an equation, then the transmitter does not need to perform the DFT computation on the pilot signal provided the equation is store in a memory or the like. For example, if a pilot signal is a Zadoff-Chu sequence, then assuming that the above equation (2) is regarded as a time sequence, a sequence of the pilot signal in the frequency domain is expressed by the following equation (3):

[Equation 3]

$$C_k(n) = c_k^*(k^{-1} \cdot n(\text{mod Ntx\_p})) \cdot C_k(0) \quad (3)$$

$$(n = 0, 1, \ldots, \text{Ntx\_p} - 1) \text{ where } C_k(0) = \sum_{n=0}^{\text{Ntx\_p}-1} c_k(n)$$

Therefore, by storing the above equation (3) in a memory or the like, a pilot sequence in the frequency domain can simply be calculated according to the equation (3), using parameters indicated upon communications. In the equation (3), $C_k(n)$ represents the frequency domain of the Zadoff-Chu sequence, and $c_k(n)$ the time domain of the Zadoff-Chu sequence.

A method of solving the problem in the receiver, i.e., a method of eliminating the IDFT computation performed on the pilot signal by the receiver, will be described below.

In the single carrier transmission system according to the present invention, the receiver has a memory for storing a pilot sequence in the frequency domain, as with the transmitter. The receiver can have such a memory for storing a pilot sequence in the frequency domain because the pilot signal is a known sequence as described above. Furthermore, the single carrier transmission system according to the present invention is capable of completely eliminating the IDFT computation in the receiver by realizing an amplitude estimation, which has been performed in the time domain according to the background art, in the frequency domain.

In order to determine amplitude information required for demodulation, the receiver according to the background art equalizes the received pilot signal in the frequency domain over the propagation channel, thereafter performs the IDFT computation to convert the pilot signal back into a signal in the time domain, and determines correlation value between the signal and a pilot sequence in the time domain from the transmitter. Specifically, an estimated amplitude value in the frequency domain is calculated according to the following equation (4):

[Equation 4]

Estimated amplitude value in frequency domain = $\frac{1}{\text{Ntx\_p}} \sum_{n=0}^{\text{Ntx\_p}-1} A_n^* B_n$ (4)

This value is exactly the same as the estimated amplitude value in the frequency domain according to the above equation (1).

The single carrier transmission system according to the present invention can reduce the complexity of at least one of the DFT computation performed by the transmitter and the IDFT computation performed by the receiver, regardless of pilot sequence length Ntx_p. Even if a prime number is selected as pilot sequence length Ntx_p, for example, the single carrier transmission system can reduce the complexity of the DFT computation performed by the transmitter and the IDFT computation performed by the receiver.

1st Exemplary Embodiment

Figure 5:
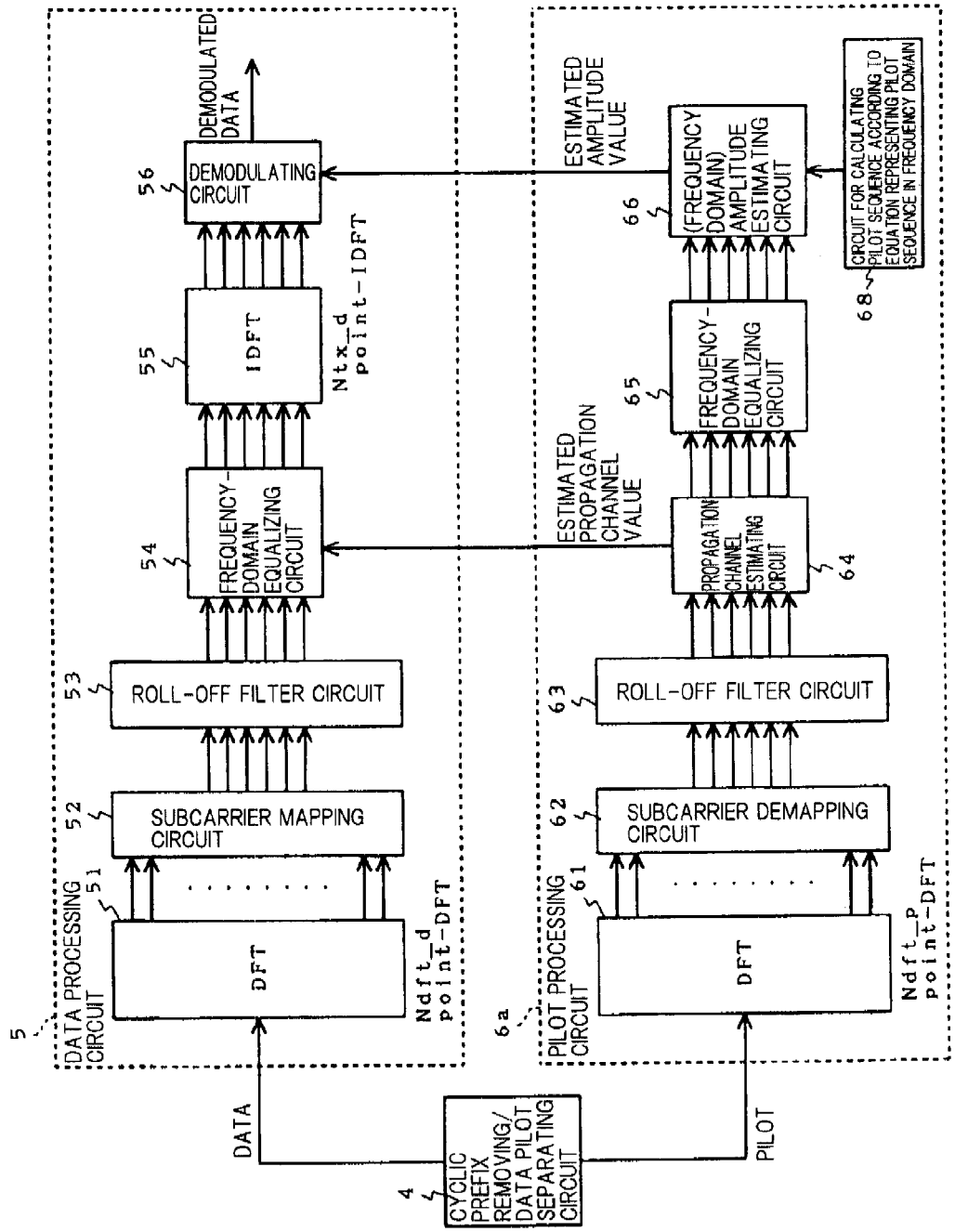
FIG. 5 is a block diagram showing the configuration of a first exemplary embodiment of a transmitter shown in FIG. 4.

As shown in FIG. 5, a transmitter according to a first exemplary embodiment comprises data processing circuit 1, pilot processing circuit 2, and time-division multiplexing circuit 3.

Data processing circuit 1 comprises a data encoding circuit, not shown, DFT circuit 11, roll-off filter circuit 12, subcarrier mapping circuit 13, IDFT circuit 14, and cyclic prefix adding circuit 15.

Pilot processing circuit 2 comprises memory 21 for storing a pilot sequence in the frequency domain, roll-off filter circuit 22, subcarrier mapping circuit 23, IDFT circuit 24, and cyclic prefix adding circuit 25.

Figure 1:
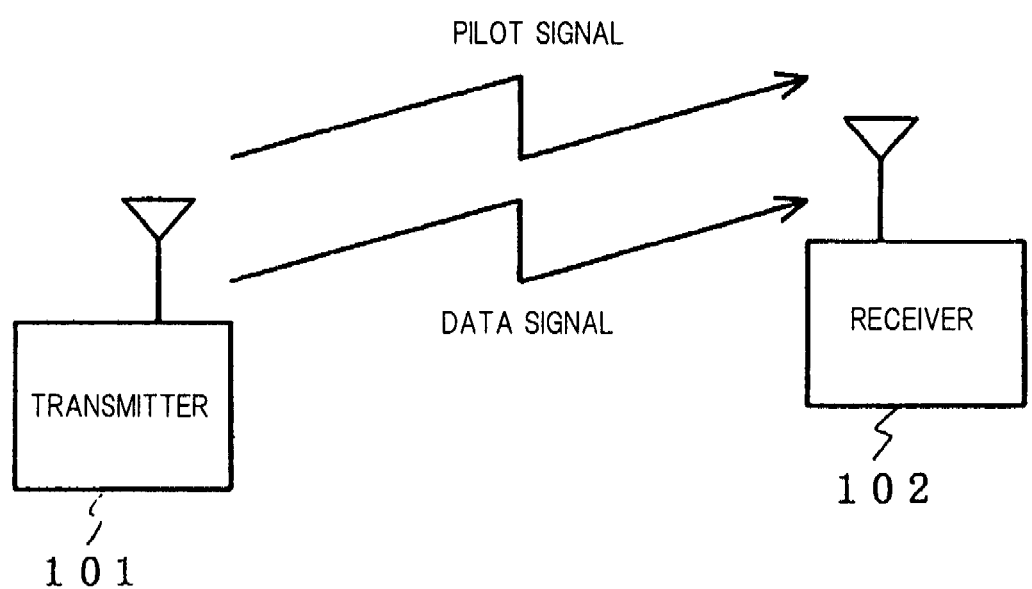
FIG. 1 is a schematic view showing a cyclic prefix adding process.
Figure 2:
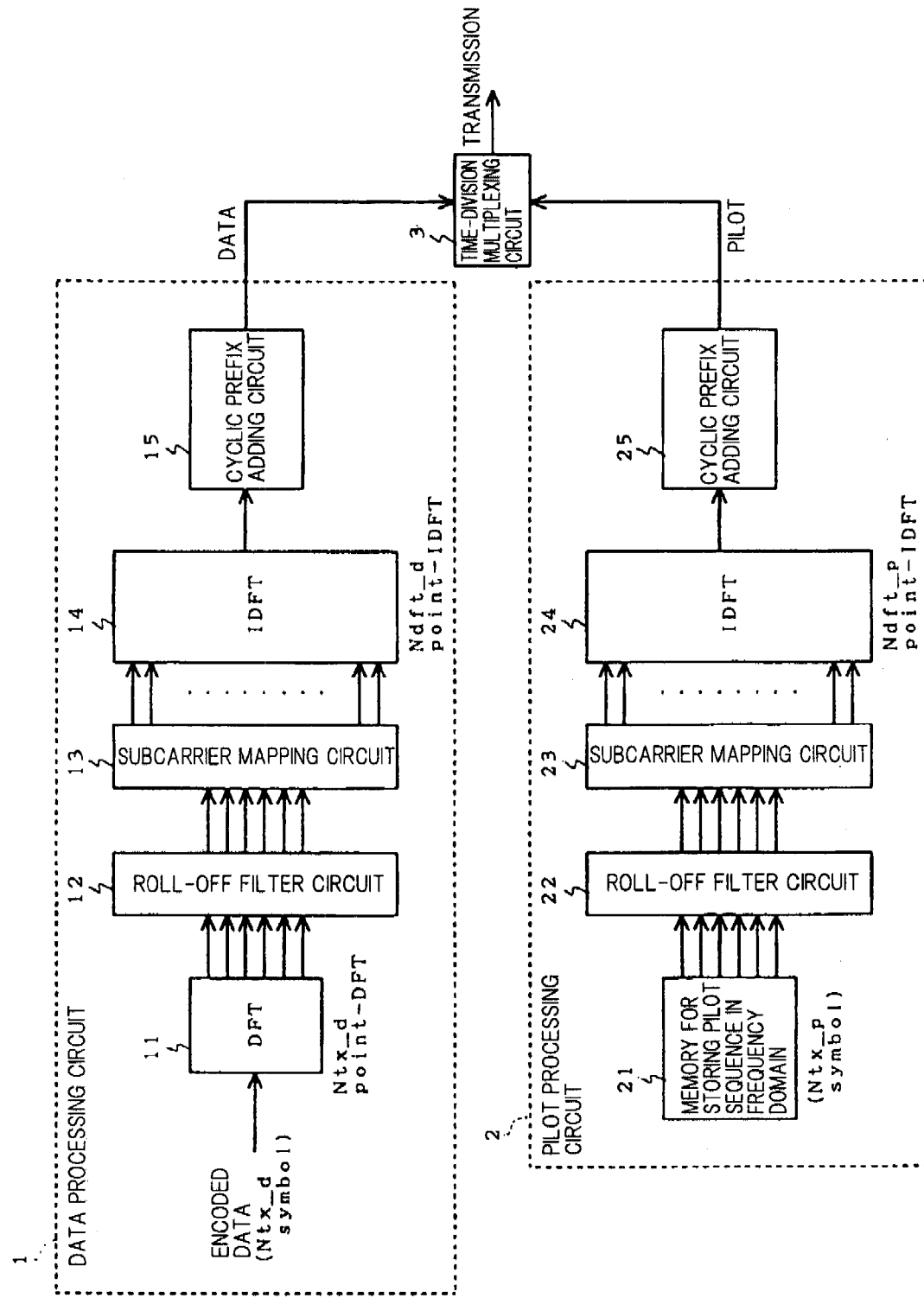
FIG. 2 is a block diagram showing the configuration of a transmitter of the background art.

In the transmitter according to the first exemplary embodiment, data processing circuit 1 is configured and operates in the same manner as with data processing circuit 110 of the transmitter according to the background art shown in FIG. 2. Pilot processing circuit 2 is configured and operates in the same manner as with pilot processing circuit 120 of the transmitter according to the background art shown in FIG. 2 except that it has memory 21 instead of DFT circuit 121.

In data processing circuit 1, DFT circuit 11 performs an Ntx_d point DFT computation on a data signal, thereby converting the data signal into a frequency-domain signal. The data signal is delimited to a data block size (=Ntx_d) in which encoded data symbols are transmitted as one block, and comprises Ntx_d symbols. In the present exemplary embodiment, the data block size is in conformity with the number of subcarriers before passing through roll-off filter circuit 12.

Roll-off filter circuit 12 performs a roll-off filtering process on the converted frequency-domain data signal in the frequency domain. Subcarrier mapping circuit 13 maps the data signal that has passed through roll-off filter circuit 112 onto subcarriers (specified for respective users). "0" is inserted into subcarriers that are not specified for respective users. Subcarrier mapping circuit 13 generates a data signal having a total of Ndft_d symbols.

IDFT circuit 14 performs an Ndft_d point IDFT computation on the subcarrier-mapped data signal (signal comprising Ndft_d subcarriers), thereby converting the data signal back into a time-domain signal. Cyclic prefix adding circuit 15 adds a cyclic prefix to each of the IDFTed blocks. The cyclic prefix is added to allow the receiver to effectively carry out a frequency domain equalizing process.

Pilot processing circuit 2 will be described below.

In pilot processing circuit 2, memory 21 stores a pilot sequence in the frequency domain in advance. The pilot sequence in the frequency domain represents a pilot signal converted into a frequency-domain signal that is generated by performing an Ntx_p point DFT computation on pilot signal symbols (the number of symbols=a sequence length=a pilot block size=the number of subcarriers before a pilot signal passes through the transmission filter=Ntx_p) transmitted as one block. In the present exemplary embodiment, the data block size is in conformity with the number of subcarriers before passing through roll-off filter circuit 22.

The same processing operation as the processing operation on the data signal is performed on the pilot sequence stored in memory 21. Specifically, roll-off filter circuit 22 performs a roll-off filtering process on the pilot sequence stored in memory 21. Subcarrier mapping circuit 23 performs a subcarrier mapping process on the pilot sequence after it is processed by roll-off filter circuit 22. IDFT circuit 24 performs an Ndft_p point IDFT computation on the subcarrier-mapped pilot sequence, thereby converting the pilot sequence back into a pilot sequence in the time domain. Cyclic prefix adding circuit 25 adds a cyclic prefix to the converted pilot sequence in the time domain.

Time-division multiplexing circuit 3 time-division-multiplexes the data signal and the pilot signal (pilot sequence) to which the cyclic prefix is added, and transmits the time-division-multiplexed signal to the receiver. According to Non-patent Document 1, Ntx_p=Ntx_d/2.

As shown in FIG. 6, the receiver according to the first exemplary embodiment comprises cyclic prefix removing/data pilot separating circuit 4, data processing circuit 5, and pilot processing circuit 6.

Data processing circuit 5 comprises DFT circuit 51, subcarrier demapping circuit 52, roll-off filter circuit 53, frequency-domain equalizing circuit 4, IDFT circuit 55, and demodulating circuit 56. Pilot processing circuit 6 comprises DFT circuit 61, subcarrier demapping circuit 62, roll-off filter circuit 63, propagation channel estimating circuit 64, frequency-domain equalizing circuit 65, amplitude estimating circuit (frequency domain) 66, and memory 67 for storing a pilot sequence in the frequency domain.

Figure 3:
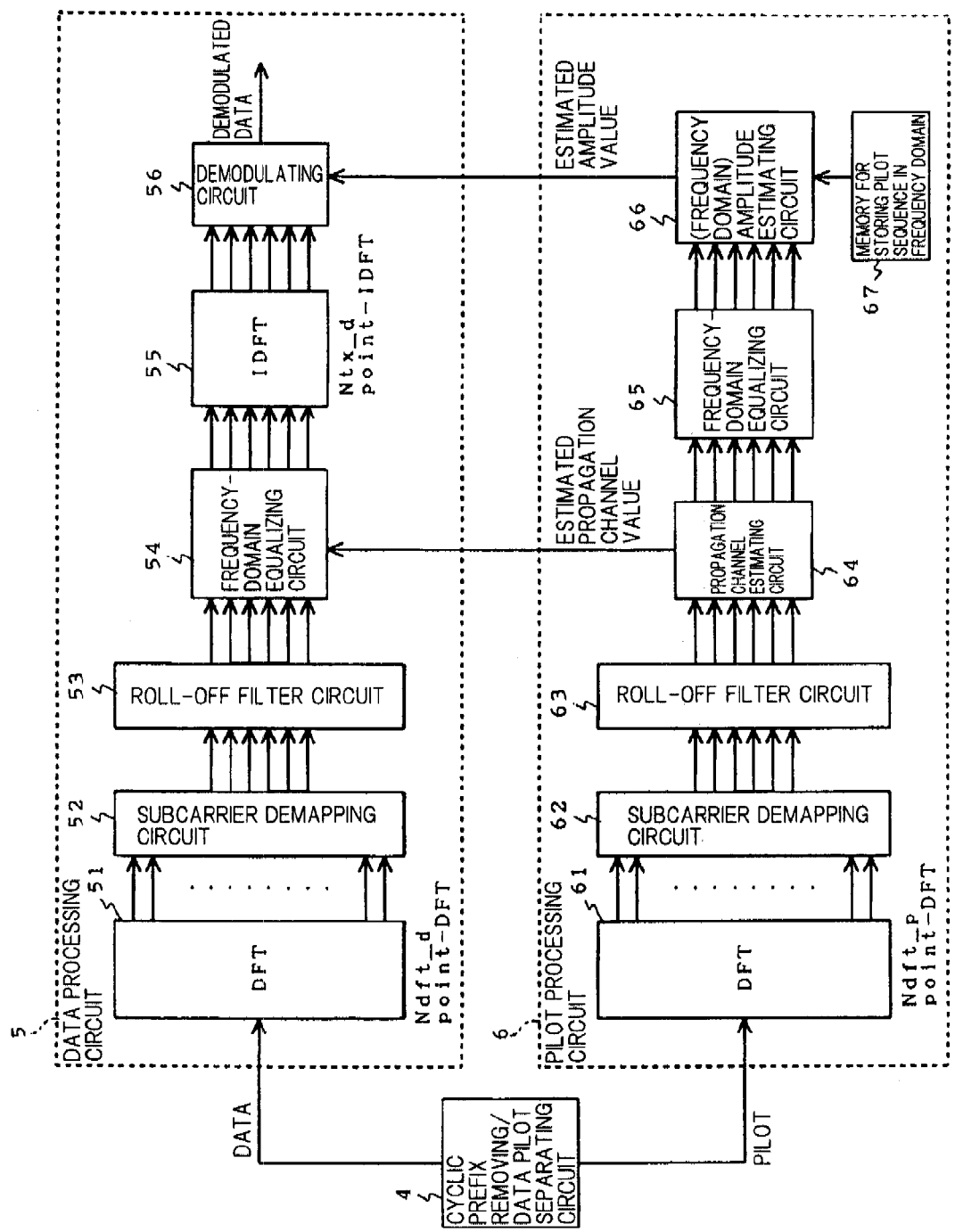
FIG. 3 is a block diagram showing the configuration of a receiver of the background art.

In the receiver according to the first exemplary embodiment, data processing circuit 5 is configured and operates in the same manner as with data processing circuit 150 of the receiver according to the background art shown in FIG. 3. Pilot processing circuit 6 is configured and operates in the same manner as with pilot processing circuit 160 of the transmitter according to the background art shown in FIG. 3 except that it has memory 67 instead of DFT circuit 166.

Cyclic prefix removing/data pilot separating circuit 4 removes the cyclic prefixes from the received signal. Cyclic prefix removing/data pilot separating circuit 4 demultiplexes the time-division-multiplexed signal to separate the received data part and the received pilot part from each other, and outputs the received data part (the received data signal) to data processing circuit 5 and also outputs the received pilot part (the received pilot signal) to pilot processing circuit 6.

In pilot processing circuit 6, DFT circuit 61 performs an Ndft_p point DFT computation on the received pilot signal which is input thereto, thereby converting it into a received pilot signal in the frequency domain. Subcarrier demapping circuit 62 demaps the subcarriers of the received pilot signal converted into the frequency domain, extracting only the subcarriers transmitted by the user. Roll-off filter circuit 63 performs a roll-off filtering process on the subcarrier-demapped received pilot signal. Propagation channel estimating circuit 64 estimates a propagation channel for each subcarrier, using the received pilot signal that has passed through roll-off filter circuit 63.

Frequency-domain equalizing circuit 65 performs a frequency-domain equalizing process (for equalizing subcarriers in the frequency domain by multiplying the subcarriers by respective weighting coefficients) on the received pilot signal, using the propagation channels estimated by propagation channel estimating circuit 64. Memory 67 stores a pilot sequence in the frequency domain in advance. The pilot sequence in the frequency domain represents a pilot signal converted into a frequency domain signal that is generated by performing an Ntx_p point DFT computation on pilot signal symbols (the number of symbols=a sequence length=Ntx_p) transmitted as one block. Amplitude estimating circuit 66 estimates an amplitude of the received pilot signal in the frequency domain. Amplitude estimating circuit 66 outputs the estimated amplitude value to demodulating circuit 56 of data processing circuit 5 for use in demodulating the received data signal.

In data processing circuit 5, DFT circuit 51 performs an Ndft_d point DFT computation on the received data part which is input thereto, thereby converting it into a received data signal in the frequency domain. Subcarrier demapping circuit 52 demaps the subcarriers of the received data signal converted into the frequency domain. Roll-off filter circuit 53 performs a roll-off filtering process on the subcarrier-demapped received data signal.

Frequency-domain equalizing circuit 54 performs a frequency-domain equalizing process on the received data signal that has passed through roll-off filter circuit 53, using the estimated propagation channels obtained from pilot processing circuit 6. IDFT circuit 55 performs an Ntx_d point IDFT computation on the received data signal that has passed through frequency-domain equalizing circuit 54, thereby converting the received data signal back into a received data signal in the time domain. Demodulating circuit 56 demodulates the received data signal in the time domain, using the estimated amplitude value obtained from pilot processing circuit 6.

Operation of the transmitter and the receiver according to the first exemplary embodiment will be described below with reference to FIGS. 5 and 6. Only the differences with the operation of the transmitter and the receiver according to the background art shown in FIGS. 2 and 3 will be described below.

In the present exemplary embodiment, it is assumed that the system bandwidth is of 5 MHz. In the present exemplary embodiment, it is also assumed that the number of points Ndft_d in the IDFT computation performed on the data signal by the transmitter and the DFT computation performed on the data signal by the receiver, and the number of points Ndft_p in the IDFT computation performed on the pilot signal by the transmitter and the DFT computation performed on the pilot signal by the receiver are set to Ndft_d=512 and Ndft_p=256, respectively, as with Non-patent Document 1.

In the present exemplary embodiment, furthermore, the number of points Ntx_d (=the data block size) in the DFT computation performed on the data signal by the transmitter and the IDFT computation performed on the data signal by the receiver is set to a power of 2, e.g., Ntx_d=256 (=the seventh power of 2), from the standpoint of the complexity of the DFT computation. In the present exemplary embodiment, furthermore, the Zadoff-Chu sequence described above is used as the pilot signal. The pilot block size Ntx_p is set to a prime number, e.g., 127 which is a prime number nearest to one-half (=128) of the data block size, from the standpoint of the cross-correlation.

The transmitter according to the present exemplary embodiment and the transmitter according to the background art are different from each other in that in pilot processing circuit 2, memory 21 stores a pilot sequence in the frequency domain in advance, and subcarrier mapping circuit 23 subcarrier-maps the pilot sequence in the frequency domain that is stored in memory 21. The transmitter according to the background art performs an Ntx_p point DFT computation on pilot symbols defined in the time domain, thereby converting the pilot symbols into a pilot sequence in the frequency domain, and thereafter subcarrier-maps the pilot sequence in the frequency domain.

The receiver according to the present exemplary embodiment and the receiver according to the background art are different from each other in that an amplitude is estimated in the frequency domain by determining a correlation value between the received pilot signal after being equalized in the frequency domain and the transmitted pilot sequence in the frequency domain, according to the equation (4). The receiver according to the present exemplary embodiment is different from the receiver according to the background art in that it has memory 67 for holding the transmitted pilot sequence in the frequency domain for use in estimating an amplitude in the frequency domain. The receiver according to the background art estimates an amplitude in the frequency domain by determining a correlation value between the received pilot signal after being equalized in the frequency domain, which has been converted into the time domain by performing the Ntx_p point IDFT computation according to the equation (1), and the pilot sequence in the time domain.

In the present exemplary embodiment, the ratio of the subcarrier intervals of the data and pilot signals is 1:2 (the subcarrier interval of the data signal=15 kHz and the subcarrier interval of the pilot signal=30 kHz) as with Non-patent Document 1. However, the present invention is applicable to any values of the ratio of the subcarrier intervals of the data and pilot signals.

The description which follows is also applicable to other exemplary embodiments.

If the ratio of the subcarrier intervals of the data and pilot signals is 1:1 ((the subcarrier interval of the data signal=the subcarrier interval of the pilot signal=15 kHz), then the same advantages are obtained by setting the data block size=256 and the pilot block size=257 (a prime number nearest to 256), or setting the data block size=256 and the pilot block size=251 (a prime number smaller than and nearest to 256).

If the ratio of the subcarrier intervals of the data and pilot signals is 2:1 ((the subcarrier interval of the data signal=30 kHz and the subcarrier interval of the pilot signal=15 kHz), then the same advantages are obtained by setting the data block size=128 and the pilot block size=257 or 251 or the like.

Examples of different parameter settings in the present exemplary embodiment will be described below.

In the present exemplary embodiment, a power of 2 is selected as the data block size Ntx_d from the standpoint of the complexity of the DFT computation. However, Ntx_d is not limited to a power of 2. If the complexity of the DFT computation may be large, then other than a power of 2 may be selected as the data block size Ntx_d.

In the present exemplary embodiment, a prime number is selected as the pilot block size Ntx_p from the standpoint of the cross-correlation of the Zadoff-Chu sequence (if Ntx_p=127, the cross-correlation is held to $1/\sqrt{127}$). However, Ntx_p is not limited to a prime number.

If a number other than a prime number, e.g., a number including a large prime number, is selected as the pilot block size, the same advantages as described above (an environment with a good cross-correlation) are achieved.

For example, depending on the required cross-correlation value, Ntx_p=122 (=61×2, 61 is a prime number, the cross-correlation value at this time≤$1/\sqrt{61}$), Ntx_p=134 (=67×2, 67 is a prime number, the cross-correlation value at this time≤$1/\sqrt{67}$), Ntx_p=124 (=31×4, 31 is a prime number, the cross-correlation value at this time≤$1/\sqrt{31}$), or the like may be selected. Depending on the required cross-correlation value, a numerical value other than those described above may be selected.

In an example of further different parameter settings, the system bandwidth is 2.5 MHz which is one-half of the above system bandwidth in the above examples of the settings.

In this case, according to Non-patent Document 1, the number of points Ndft_d in the IDFT computation performed on the data signal by the transmitter and the DFT computation performed on the data signal by the receiver, and the number of points Ndft_p in the IDFT computation performed on the pilot signal by the transmitter and the DFT computation performed on the pilot signal by the receiver are set to Ndft_d=256 and Ndft_p=128 (one-half of the values if the system bandwidth is 5 MHz), respectively.

The number of points Ntx_d (=the data block size) in the DFT computation performed on the data signal by the transmitter and the IDFT computation performed on the data signal by the receiver is set to a power of 2, e.g., Ntx_d=128 (=one-half of the value if the system bandwidth is 5 MHz), from the standpoint of the complexity of the DFT computation. If the Zadoff-Chu sequence is used as the pilot signal, then a prime number selected as the packet block size Ntx_p from the standpoint of the cross-correlation may be set to 61 or 67 nearest to one-half (64) of the data block size, for example.

If the system bandwidth is 2.5 MHz, the same system as described above can be realized with the above parameter settings. While the present exemplary embodiment has been described above with respect to the system bandwidth of 5 MHz or 2.5 MHz, the system bandwidth may be of any of other values than 5 MHz and 2.5 MHz depending on the system design.

According to the present exemplary embodiment, as described above, since memory 21 of the transmitter holds a pilot signal (in the frequency domain) to be subcarrier-mapped, the process for performing an Ntx_p point DFT computation on a pilot signal in the time domain to convert the pilot signal into the frequency domain, i.e., the process which is indispensable in the background art, is omitted.

According to the present exemplary embodiment, furthermore, since the receiver estimates an amplitude in the frequency domain, the process for performing an Ntx_p point IDFT computation on the pilot signal which has been equalized in the frequency domain to convert the pilot signal into the time domain, the process which is indispensable in the background art, is omitted.

The above advantages mean that pilot processing circuits 2, 6 of the transmitter and the receiver can omit the Ntx_p point DFT and IDFT computations. In other words, if a prime number is used as the pilot block size, the complexity of the DFT computation and the IDFT computation is greatly increased. According to the present exemplary embodiment, those operations are omitted. Another advantage of the present exemplary embodiment is that the complexity of the process performed by at least one of the transmitter and the receiver can be reduced. Still another advantage of the present exemplary embodiment is that the complexity of at least one of the DFT computation and the IDFT computation can be reduced.

2nd Exemplary Embodiment

Figure 7:
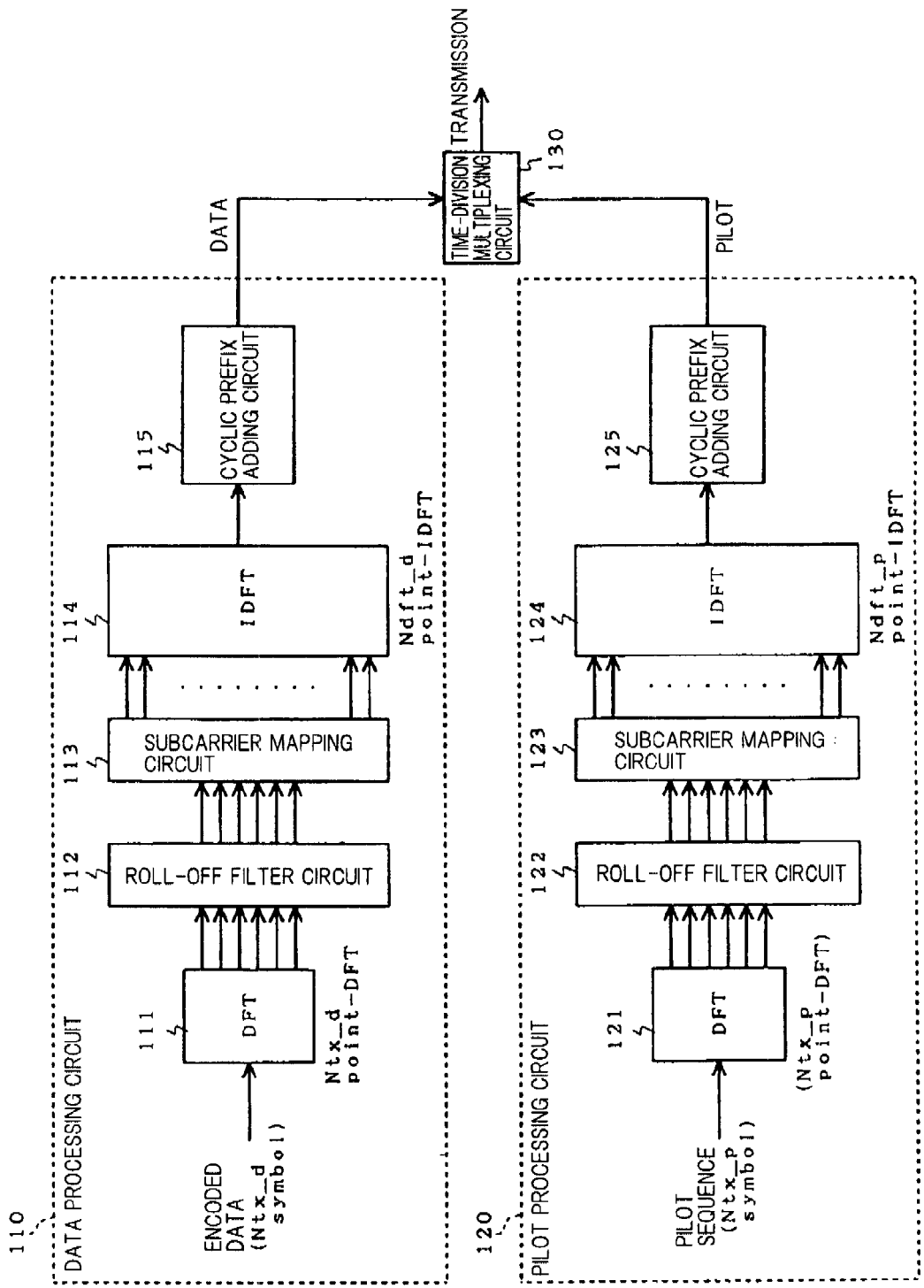
FIG. 7 is a block diagram showing the configuration of a second exemplary embodiment of the transmitter shown in FIG. 4.

As shown in FIG. 7, a transmitter according to a second exemplary embodiment is the same as the transmitter according to the first exemplary embodiment shown in FIG. 5 except that it has pilot processing circuit 2a including circuit 26 for calculating a pilot sequence according to an equation representing a pilot sequence in the frequency domain (an expression equation for the frequency domain), to replace memory 21 for storing a pilot sequence in the frequency domain. In FIG. 7, those components which are identical to those of the transmitter according to the first exemplary embodiment are denoted by identical reference characters. Operation of those components which are identical to those of the transmitter according to the first exemplary embodiment is identical to the operation of the first exemplary embodiment.

Figure 8:
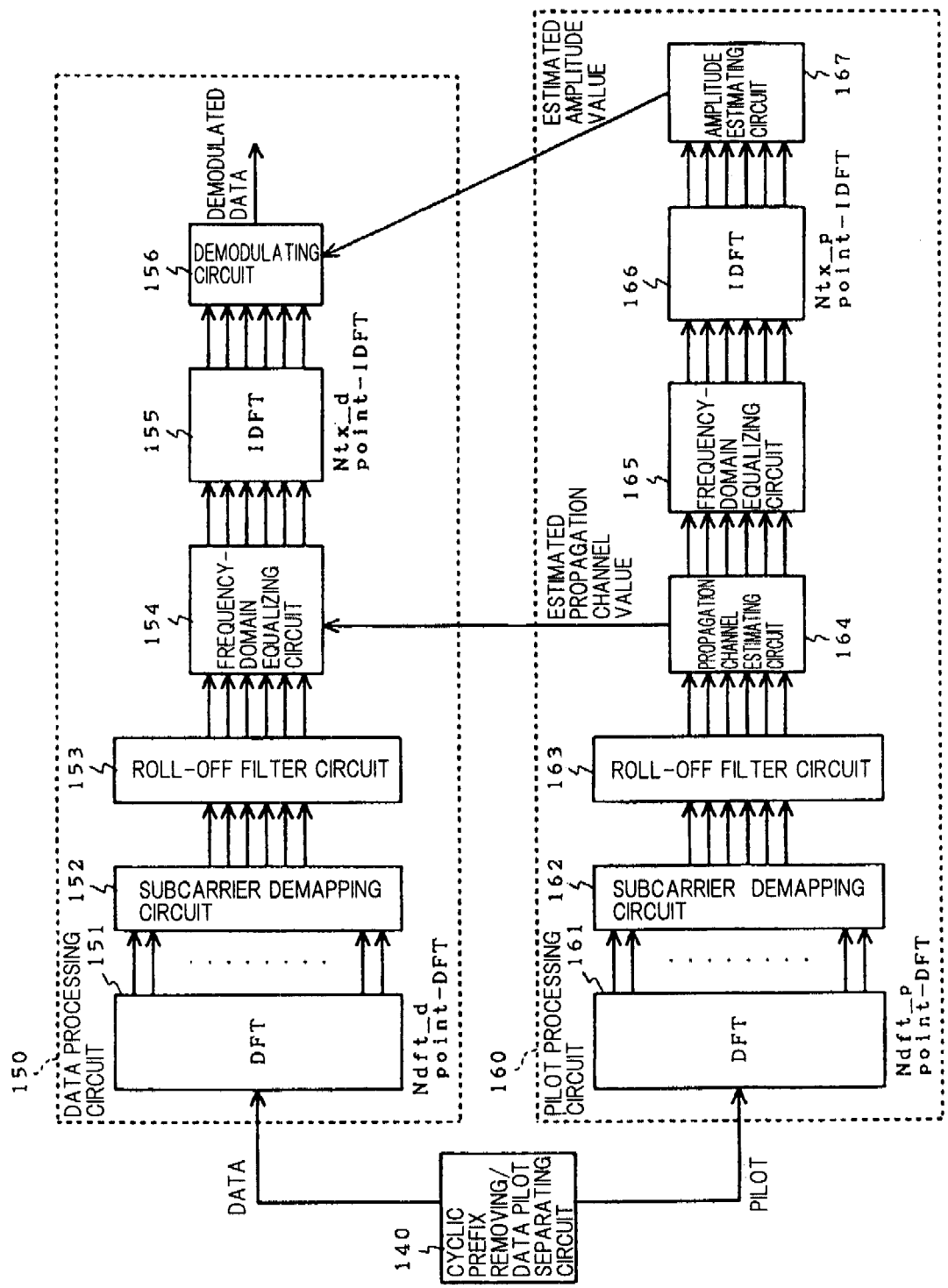
FIG. 8 is a block diagram showing the configuration of a second exemplary embodiment of the receiver shown in FIG. 4.

As shown in FIG. 8, a receiver according to the second exemplary embodiment is the same as the receiver according to the first exemplary embodiment shown in FIG. 5 except that it has pilot processing circuit 6a including circuit 68 for calculating a pilot sequence according to an equation representing a pilot sequence in the frequency domain (an expression equation for the frequency domain), to replace pilot processing circuit 6 having memory 67 for storing a pilot sequence in the frequency domain. In FIG. 8, those components which are identical to those of the receiver according to the first exemplary embodiment are denoted by identical reference characters. Operation of those components which are identical to those of the receiver according to the first exemplary embodiment is identical to the operation of the first exemplary embodiment.

In the first exemplary embodiment, memory 21 of the transmitter holds a signal sequence (a pilot sequence in the frequency domain) produced by DFTing a pilot signal in the time domain.

In the second exemplary embodiment, based on the recognition that if the Zadoff-Chu sequence is used as a pilot sequence, then the frequency domain thereof can completely be expressed by an equation (specifically, the equation (3)), the transmitter holds the expression equation for the frequency domain, not the pilot sequence in the frequency domain, by having a circuit for performing the processing of the equation.

The transmitter according to the present exemplary embodiment directly calculates a pilot sequence in the frequency domain according to the equation (3) when a pilot signal is to be transmitted, and transmits the calculated pilot sequence in the frequency domain.

Similarly, the receiver according to the present exemplary embodiment holds, with pilot processing circuit 6a, the expression equation (the equation (3)) for the frequency domain, not the pilot sequence in the frequency domain. The receiver according to the present exemplary embodiment directly calculates a pilot sequence in the frequency domain according to the equation (3), and uses the calculated pilot sequence in the frequency domain to estimate an amplitude.

According to the present exemplary embodiment, a sequence (a pilot sequence in the frequency domain) produced by DFTing a pilot signal is not held by memories 21, 67, but only the expression equation for the frequency domain. Accordingly, the required memory capacity in the transmitter and the receiver can be reduced.

In FIGS. 7 and 8, circuits 26, 68 for holding only the expression equation for the frequency domain and calculating a pilot sequence according to the expression equation are illustrated. However, these circuits may be replaced with memories for holding only the expression equation for the frequency domain. In such a case, amplitude estimating circuit 66 may calculate a pilot sequence according to the expression equation for the frequency domain held by the memory.

In the present exemplary embodiment, both the transmitter and the receiver have circuits 26, 68 for calculating a pilot sequence according to the expression equation for the frequency domain. However, either one of the transmitter and the receiver may have a circuit for calculating a pilot sequence according to the expression equation for the frequency domain, and the other of the transmitter and the receiver may have a memory for holding a pilot sequence in the frequency domain.

3rd Exemplary Embodiment

A single carrier transmission system according to a third exemplary embodiment causes the transmitter or the receiver according to the first exemplary embodiment or the second exemplary embodiment to perform a process for adjusting the roll-off factor of the data part and the roll-off factor of the pilot part in order to equalize the bandwidths used for transmitting the data and pilot signals which have passed through the roll-off filter circuits.

If the subcarrier interval of the pilot signal is twice the subcarrier interval of the data signal (see Non-patent Document 1), the bandwidths used for transmitting the data and pilot signals are expressed by:

the bandwidth used for transmitting the data signal which has passed through the roll-off filter circuit $$=Ntx\_d \times A \times (1+\text{roll-off factor } \alpha), \text{ and}$$

the bandwidth used for transmitting the pilot signal which has passed through the roll-off filter circuit $$=Ntx\_p \times 2A \times (1+\text{roll-off factor } \alpha)$$

where A represents the subcarrier interval of the data signal, and the roll-off factor $\alpha$ is set to a suitable value in the range of $0 \le \alpha \le 1$. For example, A is set to A=15 kHz according to Non-patent Document 1.

If the ratio of the data block size Ntx_d and the pilot block size Ntx_p is set to 2:1 as is the case with the background art (Non-patent Document 1), then the bandwidth used for transmitting the data signal and the bandwidth used for transmitting the pilot signal are equal to each other at all times regardless of the roll-off factor $\alpha$, as can be seen from the above equations. Since the pilot signal is transmitted in the band of all the subcarriers used to transmit the data signal, estimated propagation channel values for all the subcarriers used to transmit the data signal are obtained.

However, if Ntx_d=128, Ntx_p=61 (system bandwidth=2.5 MHz), for example, as shown in the first exemplary embodiment, then the bandwidths used for transmitting the data and pilot signals are expressed by:

the bandwidth used for transmitting the data signal which has passed through the roll-off filter circuit $$= 128 \times 15 \times (1 + 0.22)$$
$$= 2342.4 \text{ kHz}( = 2.3424 \text{ MHz}), \text{ and}$$

-continued the bandwidth used for transmitting the pilot signal which has passed through the roll-off filter circuit $= 61 \times 30 \, \alpha \times \times (1 + 0.22)$ $= 2232.6 \text{ kHz}( = 2.2326 \text{ MHz})$ (if the roll-off factor α is set to α=0.22). Therefore, the bandwidth used for transmitting the pilot signal is smaller than the bandwidth used for transmitting the data signal. As a result, estimated propagation channel values cannot be obtained for some of the subcarriers used to transmit the data signal.

Figure 9:
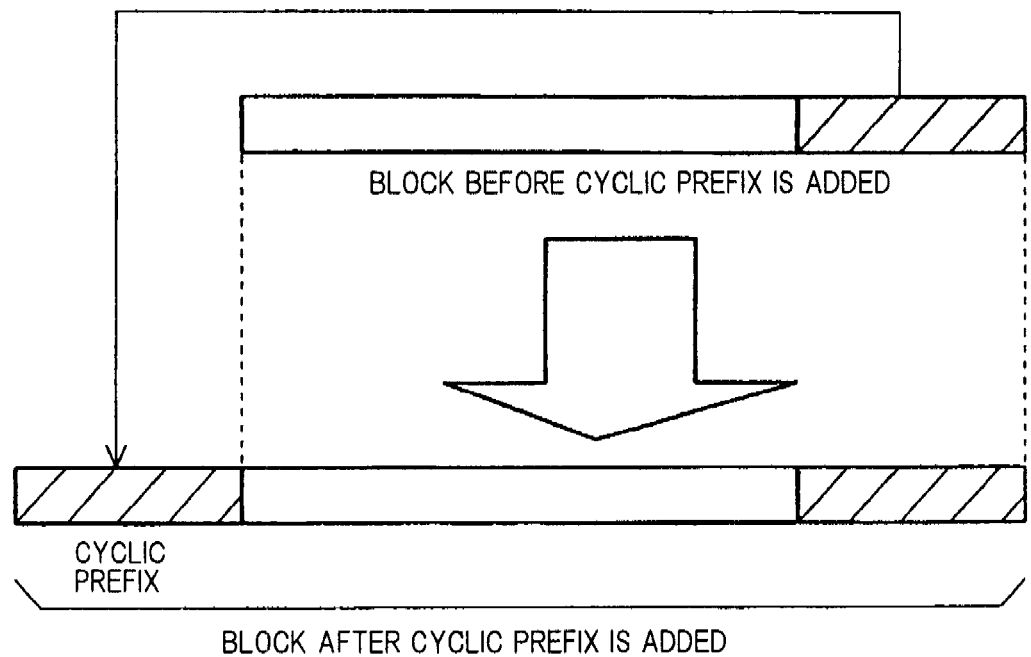
FIG. 9 is a schematic diagram showing a roll-off filtering process carried out by a third exemplary embodiment of a single carrier transmission system according to the present invention.

According to the present exemplary embodiment, the above problem is solved by independently setting roll-off factors of the roll-off filter circuits for passing the data signal and the pilot signal therethrough in order to equalize the bandwidths used for transmitting the data and pilot signals (the numbers of subcarriers used for transmission) after the data and pilot signals have passed through the roll-off filter circuits. In other words, the roll-off factors for the data signal and the pilot signals are set to satisfy the relationship:

the bandwidth used for transmitting the data signal which has passed through the roll-off filter circuit $= \text{Ntx\_d} \times A \times (1 + \text{roll-off factor of the data signal})$ $= \text{the bandwidth used for transmitting the pilot signal}$ $= \text{Ntx\_p} \times 2 \times A \times (1 + \text{roll-off factor of the pilot signal}).$ If the roll-off factor for the pilot signal is set to 0.28 with the roll-off factor for the data signal being set to 0.22, then the bandwidths used for transmitting the data and pilot signals are 2.3424 MHz, and the above equations are satisfied. As shown in FIG. 9, since the bandwidths used for transmitting the data and pilot signals are equal to each other, and the pilot signal is transmitted in the entire band used to transmit the data signal, estimated propagation channel values for all the subcarriers used to transmit the data signal are obtained.

In the present exemplary embodiment, as described above, as the roll-off factors for the data signal and the pilot signal are set in order to equalize the bandwidths used for transmitting the data and pilot signals (the numbers of subcarriers used for transmission) which have passed through the roll-off filter circuits, the receiver can obtain estimated propagation channel values for all the subcarriers used to transmit the data signal even if the bandwidth used for transmitting the pilot signal having passed through the roll-off filter circuit is smaller than the bandwidth used for transmitting the data signal.

According to the present invention, the above exemplary embodiments are applicable singly or in combination. The present invention is applicable to not only an uplink transmission scheme in which the transmitter is a mobile station (e.g., UE: User Equipment) and the receiver is a base station (e.g., Node-B), but also a downlink transmission scheme in which the transmitter is a base station and the receiver is a mobile station.

The functions of data processing circuit 1 of the transmitter, pilot processing circuits 2, 2a of the receiver, time-division multiplexing circuit 3, cyclic prefix removing/data pilot separating circuit 4, data processing circuit 5 of the receiver, pilot processing circuits 6, 6a of the receiver, DFT circuits 11, 51, 61, roll-off filter circuits 12, 22, 53, 63, subcarrier mapping circuits 12, 23, IDFT circuits 14, 24, 55, cyclic prefix adding circuits 15, 25, memory 21 for storing a pilot sequence in the frequency domain, circuits 26, 68 for calculating a pilot sequence according to an equation representing a pilot sequence in the frequency domain, subcarrier demapping circuits 52, 62, frequency-domain equalizing circuits 54, 65, demodulating circuit 56, propagation channel estimating circuit 64, amplitude estimating circuit (frequency domain) 66, and memory 67 for storing a pilot sequence in the frequency domain, which are shown in the above exemplary embodiments, may be realized by hardware circuits such as LSI circuits or the like including various logic circuits, memories, etc., or may be realized by a processing apparatus (computer) having a CPU for executing processing sequences according to programs. If the functions of the circuits shown in the exemplary embodiments are realized by the processing apparatus, then the processing apparatus has a recording medium for storing the programs, and the CPU executes the processing sequences according to the programs to realize the functions of the circuits shown in the exemplary embodiments. The functions of the circuits shown in the exemplary embodiments can also be realized by a combination of the hardware circuits and the processing apparatus.

As described in Non-patent Document 3 (R1-051062, "On Uplink Pilot in EUTRA SC-FDMA", Texas Instruments.), for example, a Zadoff-Chu CAZAC sequence is a candidate applicable to single-carrier frequency division multiple access (FDMA).

This is because a Zadoff-Chu CAZAC sequence has a constant amplitude in both the time domain and the frequency domain and has a perfect zero circular autocorrelation property.

Non-patent Document 3 proposes that different Zadoff-Chu CAZAC sequences be assigned to a plurality of neighboring Node B's for interference averaging (interference reduction). Non-patent Document 3 also states that a sequence length be a prime number in order to reduce an inter-sequence correlation and maximize the number of Zadoff-Chu CAZAC sequences that can be used in one cell. The same description is also found in Non-patent Document 2 (K. Fazel and S. Keiser, "Multi-Carrier and Spread Spectrum Systems" (John Wiley and Sons, 2003)) and Non-patent Document 4 (R1-060059, "Considerations on Uplink Pilot Design Using CAZAC", NEC Group).

To determine a data block size and a pilot block size, it is necessary to take several factors into account. These factors are a roll-off factor, the complexity of a DFT computation, and a cross-correlation property of pilot sequences.

The roll-off factor α is determined from the tradeoff relationship between the spectral efficiency and the peak to average power ratio (PAPR).

Non-patent Document 5 (R1-050702, "DFT-Spread-OFDM with Pulse Shape Filter in Frequency domain in Evolved UTRA", NTT DoCoMo, et al.) recommends that α be 0.14 (α=0.22 for W-CDMA).

In view of the recommended value and the value employed for W-CDMA, the roll-off factor α should most preferably be in the range from 0.14 to 0.22. If the resource block size is 5 MHz (the number of occupied subcarriers of the data=300, the number of occupied subcarriers of the pilot=150), then the roll-off factor α in the range from 0.14 to 0.22 causes the data block size to be of a range ranging from 245 to 260 (=300/(1+α)) and the pilot block size to be of a range ranging from 122 to 130 (=150/(1+α)).

From the standpoint of the cross-correlation property between Zadoff-Chu CAZAC sequences, a prime number "127" is an optimum value for use as the pilot block size, and the data block size is set to a length which is twice the pilot block size (the data block size=254 (=127α×2)).

Figure 10:
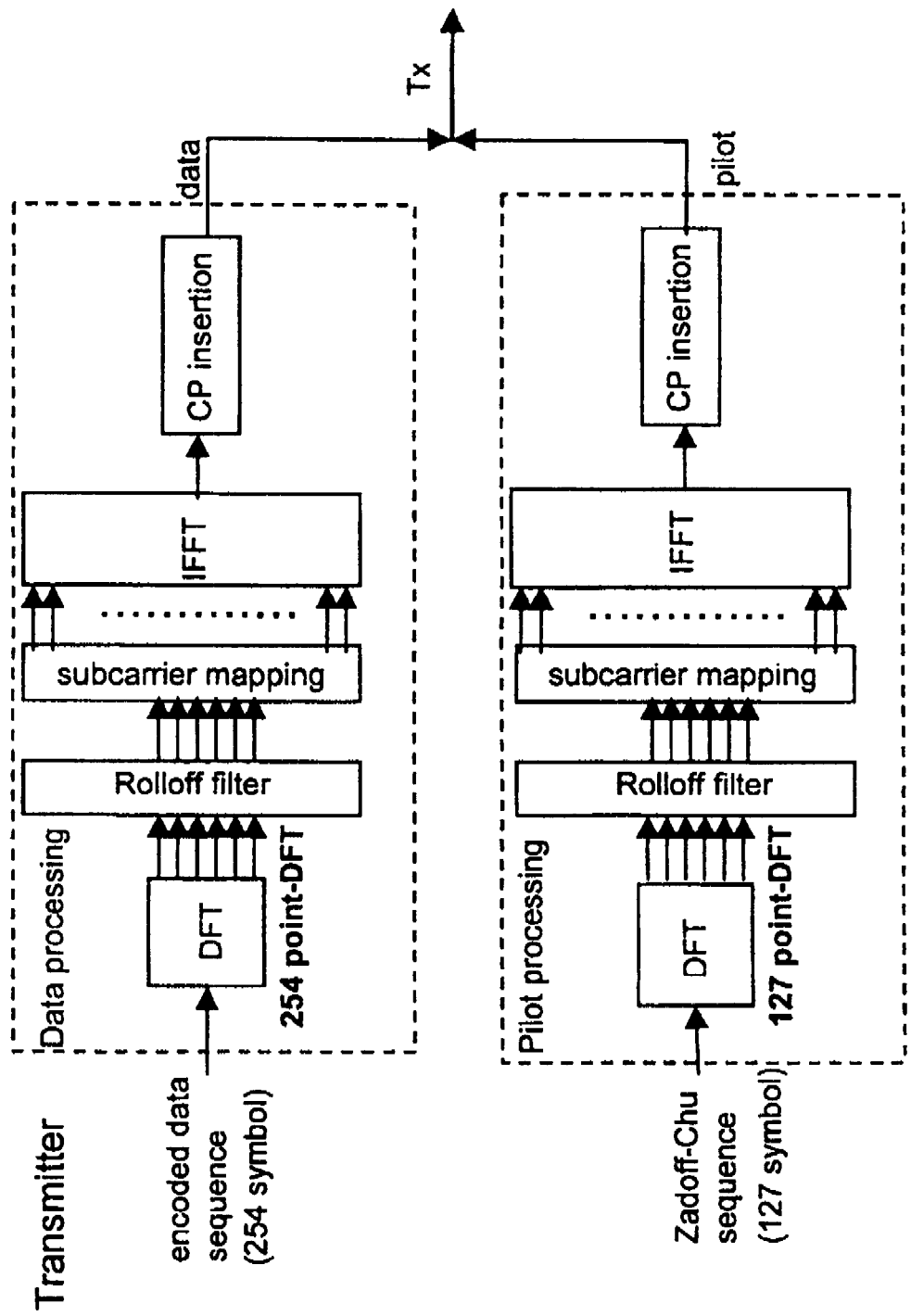
FIG. 10 is a block diagram showing the configuration of a transmitter according to another exemplary embodiment of the present invention.
Figure 11:
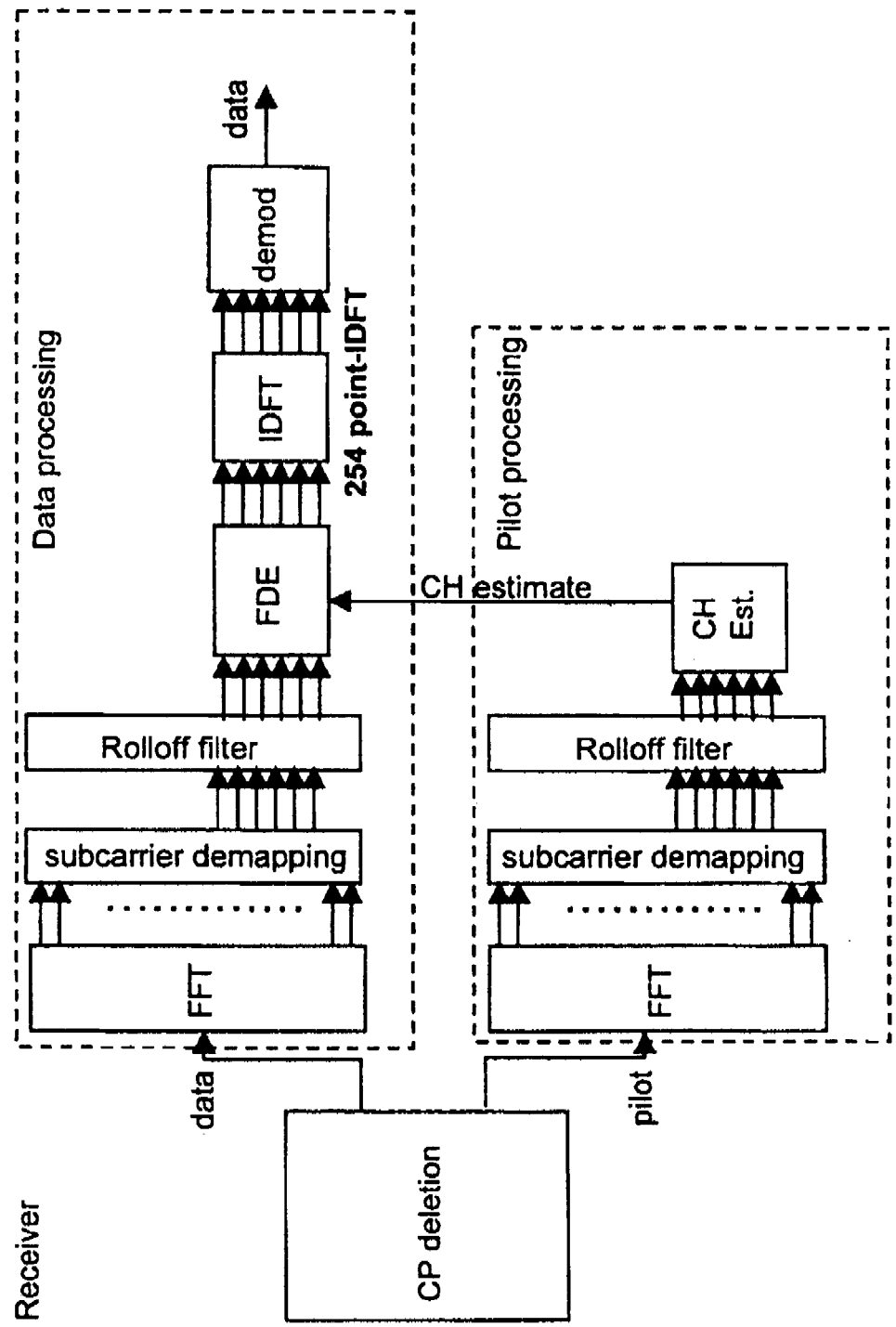
FIG. 11 is a block diagram showing the configuration of a receiver according to the other exemplary embodiment of the present invention.

As can be seen from the configurations of a transmitter and a receiver shown in FIGS. 10 and 11, the above parameter settings require a DFT computation with prime number points, resulting in an increase in the computational complexity.

A transmitter/receiver which is completely free of DFT/IDFT computations with prime number points will be described below.

First, a DFT computation with prime number points for pilot processing can be eliminated because a pilot sequence is a predetermined sequence. If a number of sequences (e.g., for cell reuse of pilot sequences) have to be kept by the transmitter/receiver (e.g., User Equipment: UE) in such a situation, then the transmitter/receiver (e.g., UE) may possibly need a large memory. However, such a problem can be solved. For example, if Zadoff-Chu CAZAC sequences are used as pilot sequences, the frequency expression according to the equations (5) below is given by a closed form according to the equation (6) below.

[Equation 5]

$$c_k = \exp\left[-\frac{j2\pi k}{N}\left(\frac{n^2}{2} + qn\right)\right] \text{ for even length } N \quad (5)$$

$$c_k \exp\left[-\frac{j2\pi k}{N}\left(n\frac{n+1}{2} + qn\right)\right] \text{ for odd length } N$$

[Equation 6]

$$C_k = c_k^*(k^{-1} \cdot n(\text{mod } N)) \cdot C_k(0) \quad (6)$$

By using the equation (6) instead of keeping all the pilot sequences themselves, the memory required in the transmitter/receiver (e.g., UE) can be made smaller.

With respect to data processing, DFT/IDFT computations cannot be eliminated from the transmitter/receiver. Therefore, in order to reduce the computational complexity, it is necessary to relax the limitation of the data block size: the pilot block size=2:1. In other words, a power of 2 or a number composed of only small radixes (prime numbers) should be selected as a data block size. In this case, from the standpoint of the complexity of DFT/IDFT computations, 256 which represents a power of 2 becomes an optimum data block size.

The pilot block size remains to be 127 from the standpoint of the cross-correlation property of the Zadoff-Chu CAZAC sequences.

Figure 12:
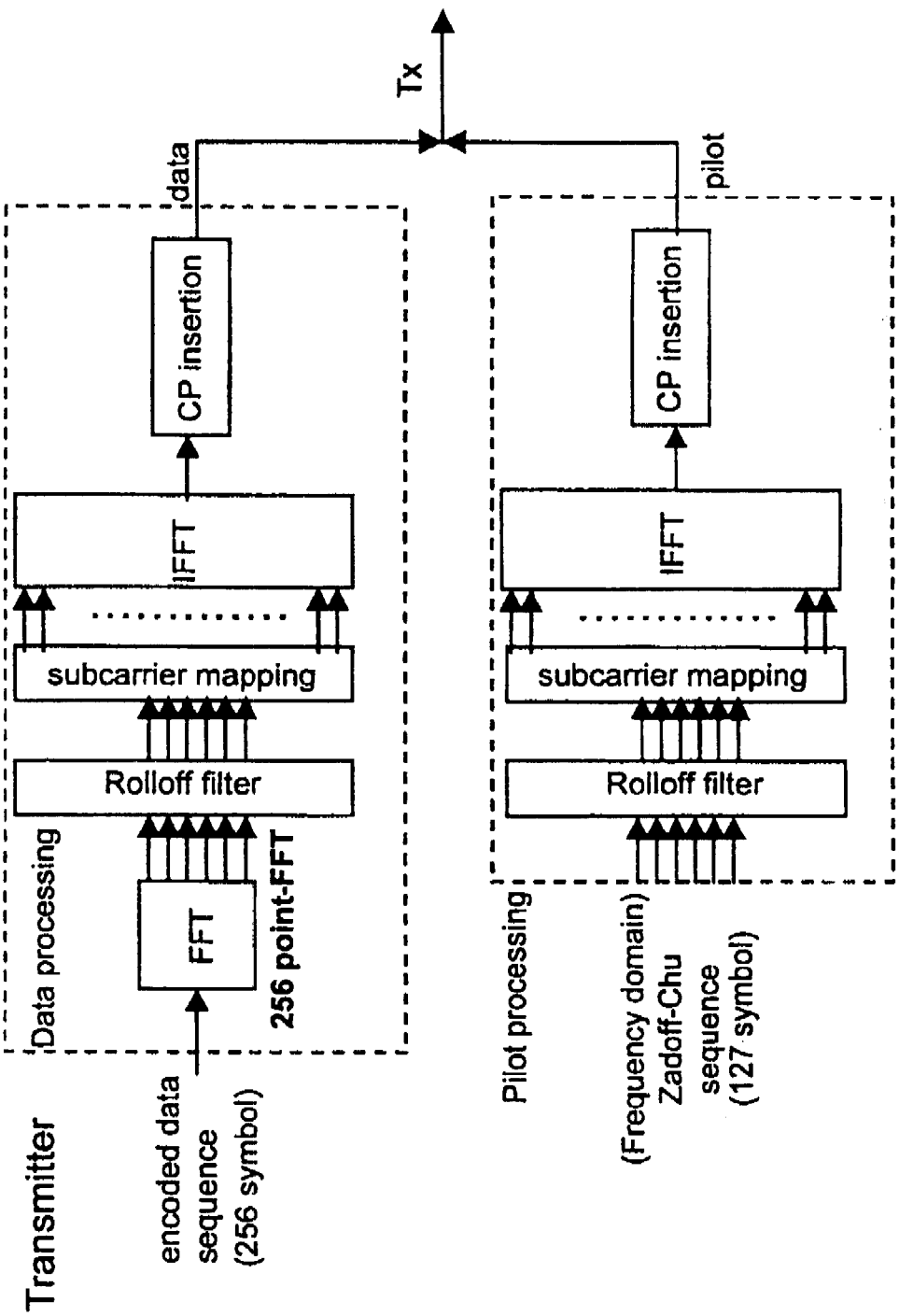
FIG. 12 is a block diagram showing the configuration of a transmitter according to still another exemplary embodiment of the present invention.
Figure 13:
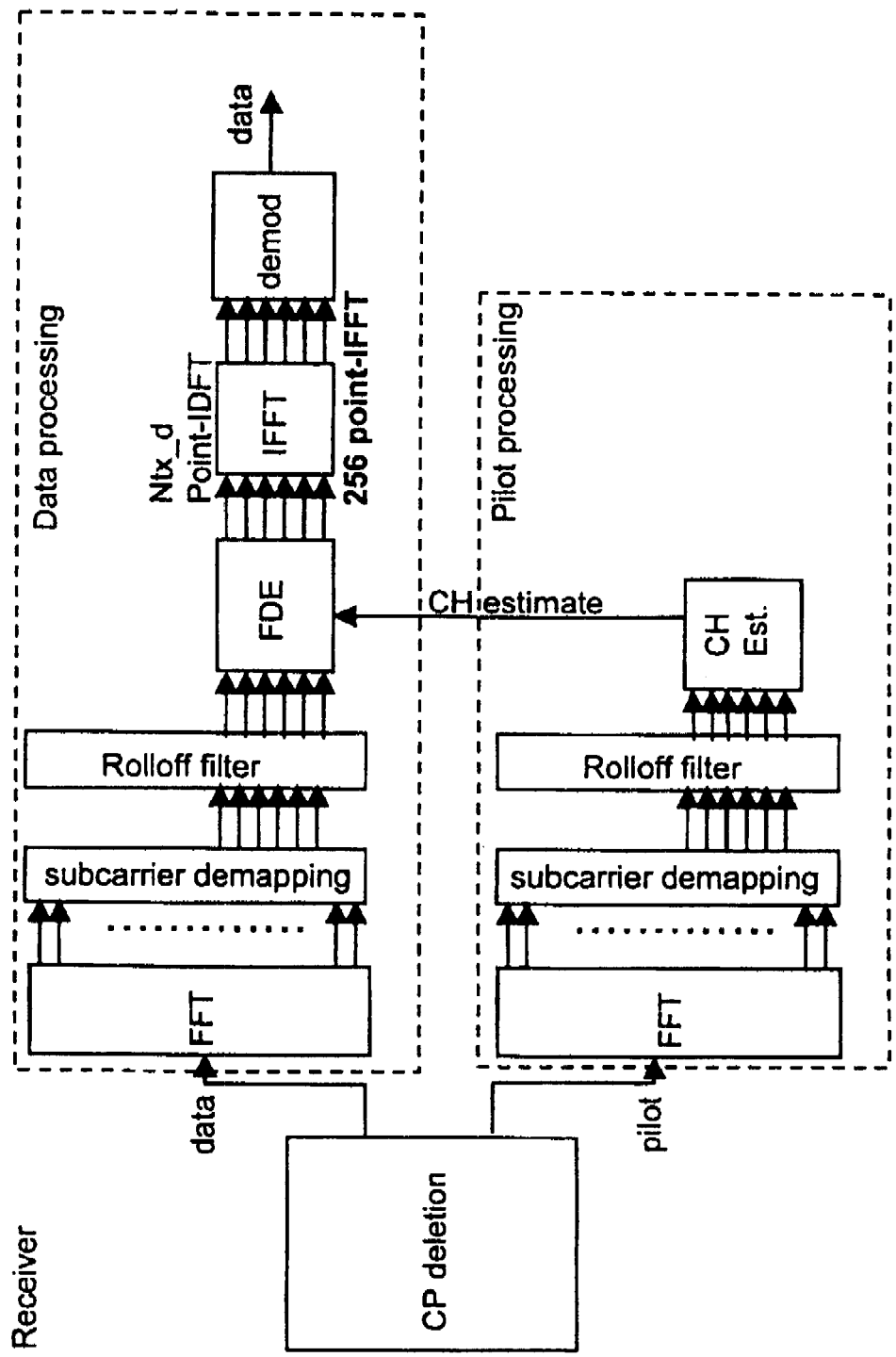
FIG. 13 is a block diagram showing the configuration of a receiver according to the still other exemplary embodiment of the present invention.

As can be seen from the configurations of a transmitter and a receiver shown in FIGS. 12 and 13, the above parameter settings do not require DFT/IDFT computations in the transmitter/receiver in spite of using Zadoff-Chu CAZAC sequences of a prime number length having a good cross-correlation property.

Similarly, if the resource block is 1.25 MHz, then a data block size=64 and a pilot block size=31 are optimum values.

With the above values being employed, the bandwidth used for pilot transmission is slightly smaller than the bandwidth used for data transmission. Therefore, estimated propagation channel values are not available for some of all the subcarriers. However, as can be understood from a graph shown in FIG. 4, this problem has almost no effect on the performance (see, for example, 3 GPP TS45.005 V5.4.0 (2002-06). In addition, the bandwidths can be set to the same size by adjusting the roll-off factor. In this manner, the bandwidth used for pilot transmission becomes equal to the bandwidth used for data transmission. FIG. 14 shows the relationship between block error rates with respect to Eb/No due to different block sizes, as determined using the parameters given in a table shown in FIG. 15.

As described above, if Zadoff-Chu CAZAC sequences are used for the pilot signal, then from the standpoint of the processing complexity in the transmitter/receiver and the cross-correlation property of the pilot signal, the relationship (limitation) between the data block size and the pilot block size (e.g., the data block size: the pilot block size=2:1) should be relaxed. For reducing the computational complexity in the transmitter/receiver (e.g., UE), an expression of a pilot sequence in the frequency domain, e.g., the equation (6), is useful.

In order to maintain a low cross-correlation property of pilot sequences and reduce the computational complexity in the transmitter and the receiver, the CAZAC sequence length should desirably be represented by a prime number or a number including a large prime factor. In addition, the length of data symbol sequences input to the DFT on the transmission side should desirably be represented by a number which is close to twice the CAZAC sequences and which is composed of only numbers represented by powers of 2 or small prime factors.

If the transmission bandwidth is 5 MHz, then a desirable CAZAC sequence length is 127 (127 is a prime number), and a desired data symbol sequence length is 256 (a power of 2 which is close to twice 127=254).

4th Exemplary Embodiment

A fourth exemplary embodiment will be described below.

According to the fourth exemplary embodiment, a method of determining a pilot block size in each of the above exemplary embodiments is contrived to reduce a degradation of the communication quality and not to greatly impair the cross-correlation property if the data block size is a multiple of 12 and the pilot block size (reference signal block size) is a multiple of 6 or 12.

Figure 16:
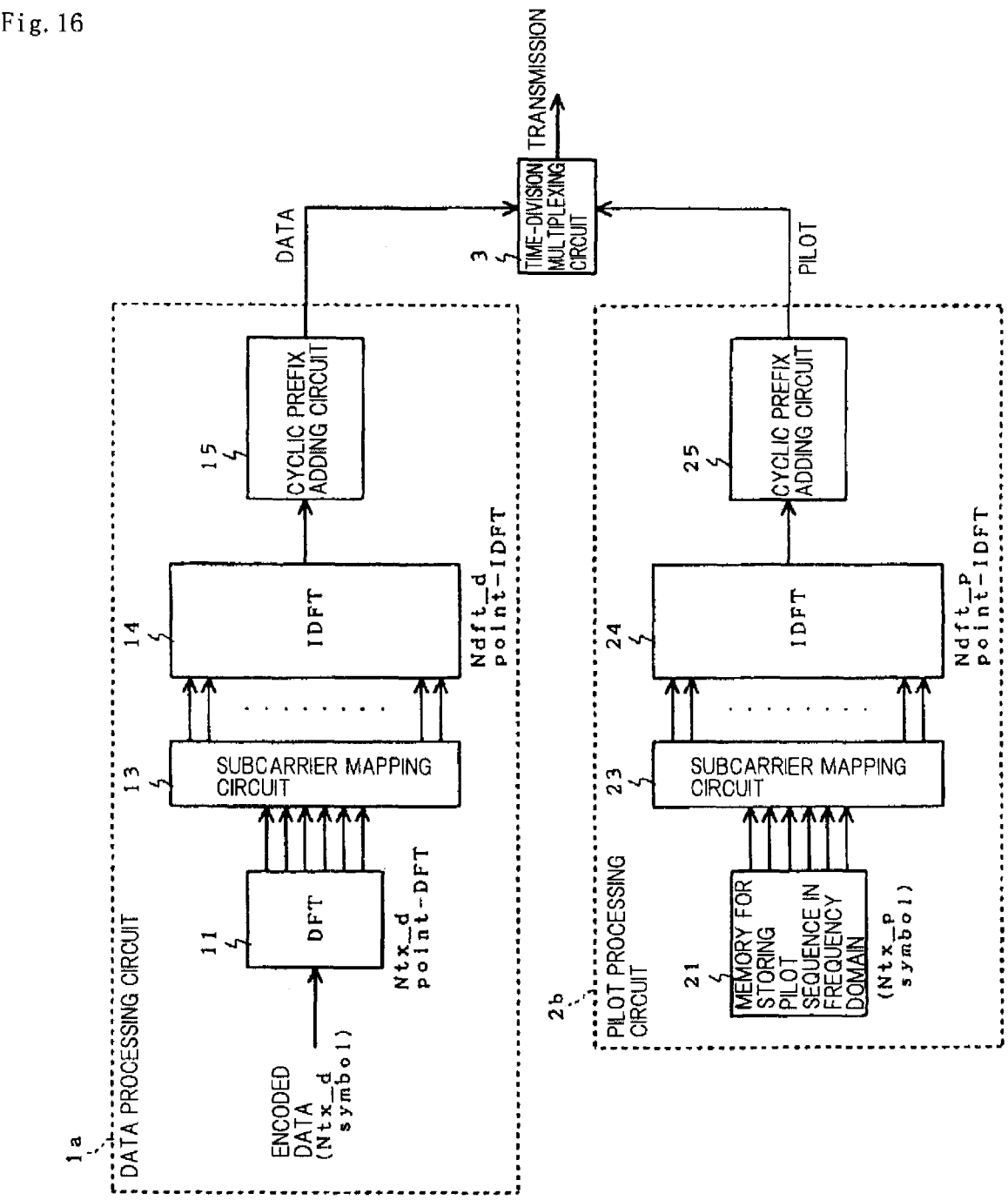
FIG. 16 is a block diagram showing the configuration of a transmitter according to a fourth exemplary embodiment of the present invention.
Figure 17:
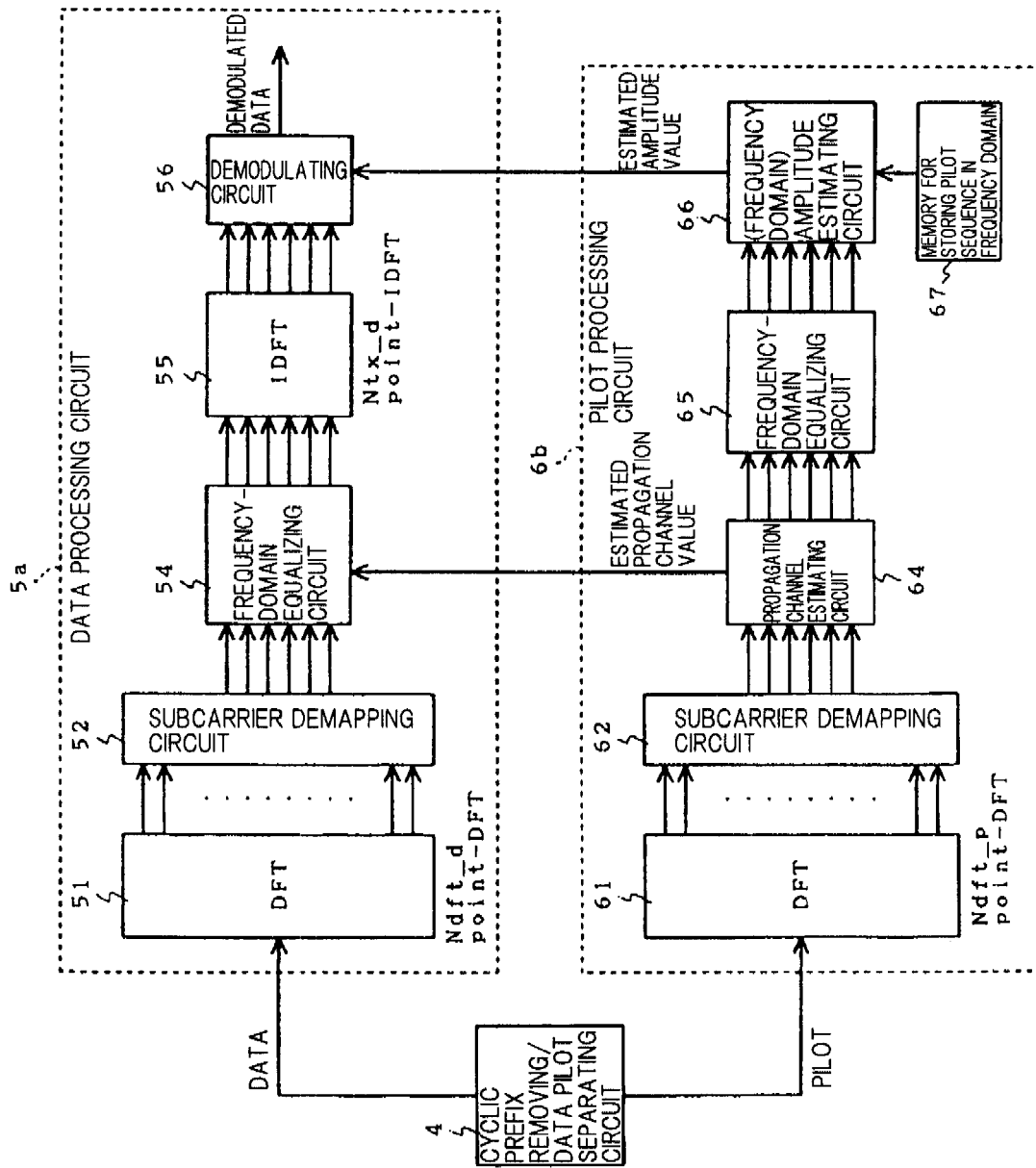
FIG. 17 is a block diagram showing the configuration of a receiver according to the fourth exemplary embodiment of the present invention.

FIG. 16 is a block diagram showing the configuration of a transmitter according to the fourth exemplary embodiment of the present invention, and FIG. 17 is a block diagram showing the configuration of a receiver according to the fourth exemplary embodiment of the present invention.

The transmitter and the receiver according to the fourth exemplary embodiment are different from the transmitter and the receiver according to the first exemplary embodiment shown in FIGS. 2 and 3 in that the roll-off filters 12, 22, 53, 63 are dispensed with, and a method of selecting a pilot block size is contrived.

As shown in FIG. 16, the transmitter according to the fourth exemplary embodiment comprises data processing circuit 1a, pilot processing circuit 2b, and time-division multiplexing circuit 3. Data processing circuit 1a comprises a data encoding circuit, not shown, DFT circuit 11, subcarrier mapping circuit 13, IDFT circuit 14, and cyclic prefix adding circuit 15. Pilot processing circuit 2b comprises memory 21 for storing a pilot sequence in the frequency domain, subcarrier mapping circuit 23, IDFT circuit 24, and cyclic prefix adding circuit 25.

As shown in FIG. 17, the receiver according to the fourth exemplary embodiment comprises cyclic prefix removing/data pilot separating circuit 4, data processing circuit 5a, and pilot processing circuit 6b. Data processing circuit 5a comprises DFT circuit 51, subcarrier demapping circuit 52, frequency-domain equalizing circuit 54, IDFT circuit 55, and demodulating circuit 56. Pilot processing circuit 6b comprises DFT circuit 61, subcarrier demapping circuit 62, propagation channel estimating circuit 64, frequency-domain equalizing circuit 65, amplitude estimating circuit (frequency domain) 66, and memory 67 for storing a pilot sequence in the frequency domain.

In the fourth exemplary embodiment, a circuit for calculating a pilot sequence according to an equation representing a frequency-domain pilot sequence may be provided instead of the memory for storing a pilot sequence in the frequency domain. Operation of the transmitter and the receiver according to the fourth exemplary embodiment is the same as the operation of the transmitter and the receiver according to the first exemplary embodiment, and will not be described below.

In the present exemplary embodiment, the transmitter sets a pilot block size of a pilot signal depending on the data block size of a data signal. Specifically, when setting a pilot block size, if the difference between a prime number that is nearest to the pilot block size and the data block is equal to or smaller than a first preset value, then the prime number is set as the pilot block size. If the difference between the prime number and the data block is not equal to or smaller than the first preset value, then a number whose difference with the data block is equal to or smaller than the first preset value and which includes a prime factor equal to or greater than a second preset value is set as the pilot block size.

The first and second preset values are determined according to requirements of the constructed system, i.e., the communication quality required by the system. The communication quality refers a bit error rate or a block error rate. Therefore, the first and second preset values are determined to satisfy the communication quality by holding an S/N ratio degradation to a preset constant value or less.

Figure 18:
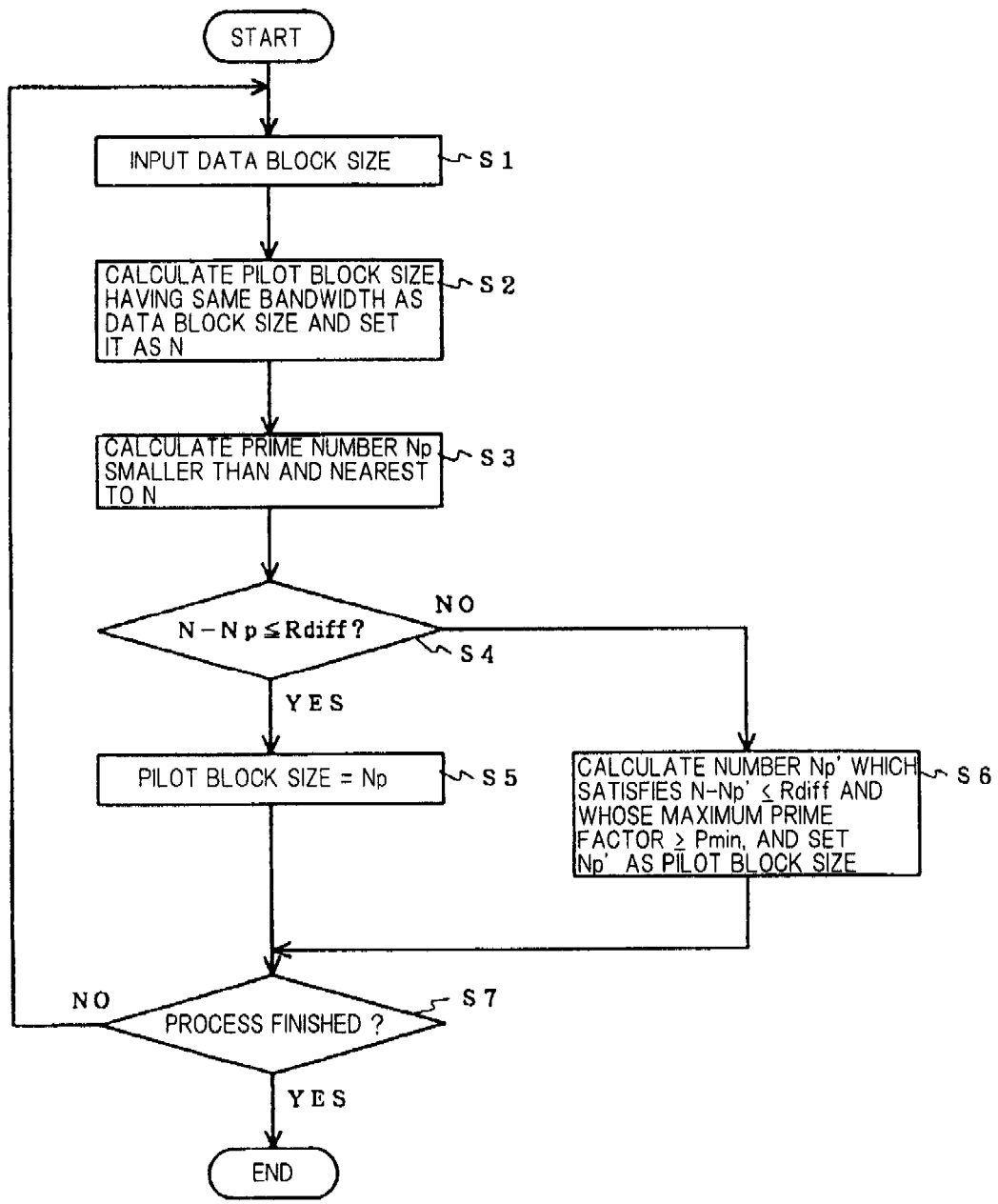
FIG. 18 is a flowchart of the sequence of a method of selecting a pilot block size according to the fourth exemplary embodiment of the present invention.

FIG. 18 is a flowchart showing a method of selecting a pilot block size according to the fourth exemplary embodiment of the present invention. The method of selecting a pilot block size according to the fourth exemplary embodiment of the present invention will be described below with reference to FIG. 18. The method of selecting a pilot block size can be realized by a computer as it executes a program. The computer will hereinafter be referred to as a pilot block size selecting apparatus.

When a data block size is input to the pilot block size selecting apparatus (step S1 in FIG. 18), the pilot block size selecting apparatus calculates a pilot block size having a bandwidth equal to the data block size or a pilot block size having a bandwidth corresponding to the data block size (e.g., ½ of the data block size), and sets the calculated pilot block size as N (step S2 in FIG. 18).

The pilot block size selecting apparatus calculates prime number Np which is smaller than the pilot block size N and which is nearest to the pilot block size N (step S3 in FIG. 18), and determines whether or not the difference between the pilot block size N and the prime number Np is equal to or smaller than a preset value (constant difference) Rdiff (N−Np≤Rdiff) (step S4 in FIG. 18).

If the difference between the pilot block size N and the prime number Np is equal to or smaller than the preset value Rdiff, then the pilot block size selecting apparatus sets the prime number Np as the pilot block size (pilot block size Np) (step S5 in FIG. 18). If the difference between the pilot block size N and the prime number Np is not equal to or smaller than the preset value Rdiff, then the pilot block size selecting apparatus calculates a number Np' which satisfies N−Np'≤Rdiff and whose maximum prime factor≥a prime number Pmin of a certain size, and sets the number Np' as the pilot block size (step S6 in FIG. 18).

The pilot block size selecting apparatus performs the above processing sequence each time a data block size (a multiple of 12) is input thereto. When the selection of a pilot block size to be stored in memories 21, 67 each for storing a pilot sequence in the frequency domain is finished (step S7 in FIG. 18), the processing sequence is put to an end.

According to the present exemplary embodiment, as described above, the pilot block size of a pilot signal is selected depending on the data block size of a data signal to reduce a degradation of the communication quality and not to greatly impair the cross-correlation property.

FIG. 19 is a graph showing the results of a simulation of the fourth exemplary embodiment. The graph shown in FIG. 9 indicates block error rates at the time 120, 118, 116, 114, 113 (113 is a prime number smaller than 120 and nearest to 120) are selected as the pilot block size (reference block size).

Parameters used in the simulation are shown in FIG. 20. In FIG. 20, the parameters include a transmission bandwidth=3.6 MHz (the number of DataCH subcarriers: 240), Channel Estimation=Real, Modulation=16QAM (16 Quadrature Amplitude Modulation), subframe format=25.814, described in FIG. 9.1.1-4 and Table 9.1.1-1 '5 MHz" case of v7.1.0, FEC (error-correcting code)=Rate ½ Turbo encoding, Channel model=TU with 6 paths, type (1) (from 3GPP TS 45.005 V5.4.0 (2002-06)), Doppler rate=5.56 Hz (3 km/h @ 2.0 GHz), Number of receive antennas=2, TTI duration=0.5 ms, Transport Block Size (including CRC)=2876 bits, Data Multiplexing=Localized FEM (Frequency Division Multiplex).

If the pilot block size is a size corresponding to the same bandwidth as the data block size (=240) (here, the pilot block size is ½ of the data block size, i.e., 120), then Eb/No required to satisfy a block error rate=10−1 is about 5.7 dB as can be seen from FIG. 19. Degradations for respective pilot block sizes of 118, 116, 114, 113 are 0.05, 0.3, 0.9, 1.5 dB, respectively (Eb/No values required to satisfy a block error rate=10−1 are compared).

According to the present exemplary embodiment, the degradations are greatly reduced and the cross-correlation property is not greatly reduced by selecting a pilot block size=118 (the number Np' selected in step S6) rather than a prime number (113) as a plot block size. The same advantages as described above are obtained when the pilot block size is of a near value in the same bandwidth as the data block size (a value near 240 in the above example).

If a prime number length is selected as a pilot block size, then very large characteristic degradations may tend to occur.

To avoid such very large characteristic degradations, according to the present exemplary embodiment, if there is a difference greater than the above value Rdiff between the pilot block size corresponding to the same bandwidth as the data block size (the same as the data block size or ½ of the data block size) and a prime number which is smaller than and closest to the pilot block size, then a number which includes as a prime factor a prime number equal to or greater than a prime number Pmin of a certain size and whose difference is equal to or greater than the value Rdiff is selected as the pilot block size.

FIGS. 21 and 22 are tables showing examples of pilot block sizes with respect to data block sizes according to the fourth exemplary embodiment of the present invention. In FIGS. 21 and 22, selected numbers which are not prime numbers are underscored.

FIG. 21 shows an example of pilot block sizes with respect to data block sizes for the value Rdiff=4 and the prime number Pmin of the certain size=11 (Data: Reference=2:1). In this example, when the data block size is of 12, 24, 36, 48, 60, 84, 96, 108, 120, 144, 168, 180, 204, 216, 228, 264, 276, and 300, the respective prime numbers 5, 11, 17, 23, 29, 41, 47, 53, 59, 71, 83, 89, 101, 107, 113, 131, 137, and 149 are selected as pilot block sizes.

When the data block size is of 72, 132, 156, 192, 240, 252, and 288, since the differences with the nearest prime numbers as respective pilot block sizes are 5 or greater, 33 (=11☐3), 66 (=11☐6), 78 (13☐6), 95 (19☐5), 119 (17☐7), 123 (=41☐3), and 143 (13☐11) which include a prime factor that is equal to or greater than the prime number Pmin of the certain size=11 are selected.

FIG. 22 shows an example of pilot block sizes with respect to data block sizes for the value Rdiff=3 and the prime number Pmin of the certain size=11 (Data: Reference=1:1). In this example, when the data block size is of 12, 24, 48, 60, 72, 84, 108, 132, 168, 180, 192, 228, 240, 252, and 264, the respective prime numbers 11, 23, 47, 59, 71, 83, 107, 131, 167, 179, 191, 227, 239, 251, and 263 are selected as pilot block sizes.

When the data block size is of 36, 96, 120, 144, 156, 204, 216, 276, 288, and 300, since the differences with the nearest prime numbers as respective pilot block sizes are 4 or greater, 33 (=11☐3), 95 (19☐5), 119 (17∞7), 143 (13☐11), 155 (31☐5), 203 (=29☐7), 215 (13☐11), 275 (=11☐25), 287 (41☐7), and 299 (=13☐23) are selected.

The values shown in FIGS. 21 and 22 may be stored in a memory for storing a pilot sequence in the frequency domain or a memory for storing a pilot sequence in the time domain, or may be calculated by a circuit for calculating a pilot sequence according to an equation representing a pilot sequence in the frequency domain or a circuit for calculating a pilot sequence according to an equation representing a pilot sequence in the time domain.

According to the present exemplary embodiment, therefore, the same advantages as those of the first exemplary embodiment of the present invention can be obtained by selecting a pilot block size as described above when the data block size is a multiple of 12 and the pilot block size is a multiple of 6 or 12.

5th Exemplary Embodiment

Figure 23:
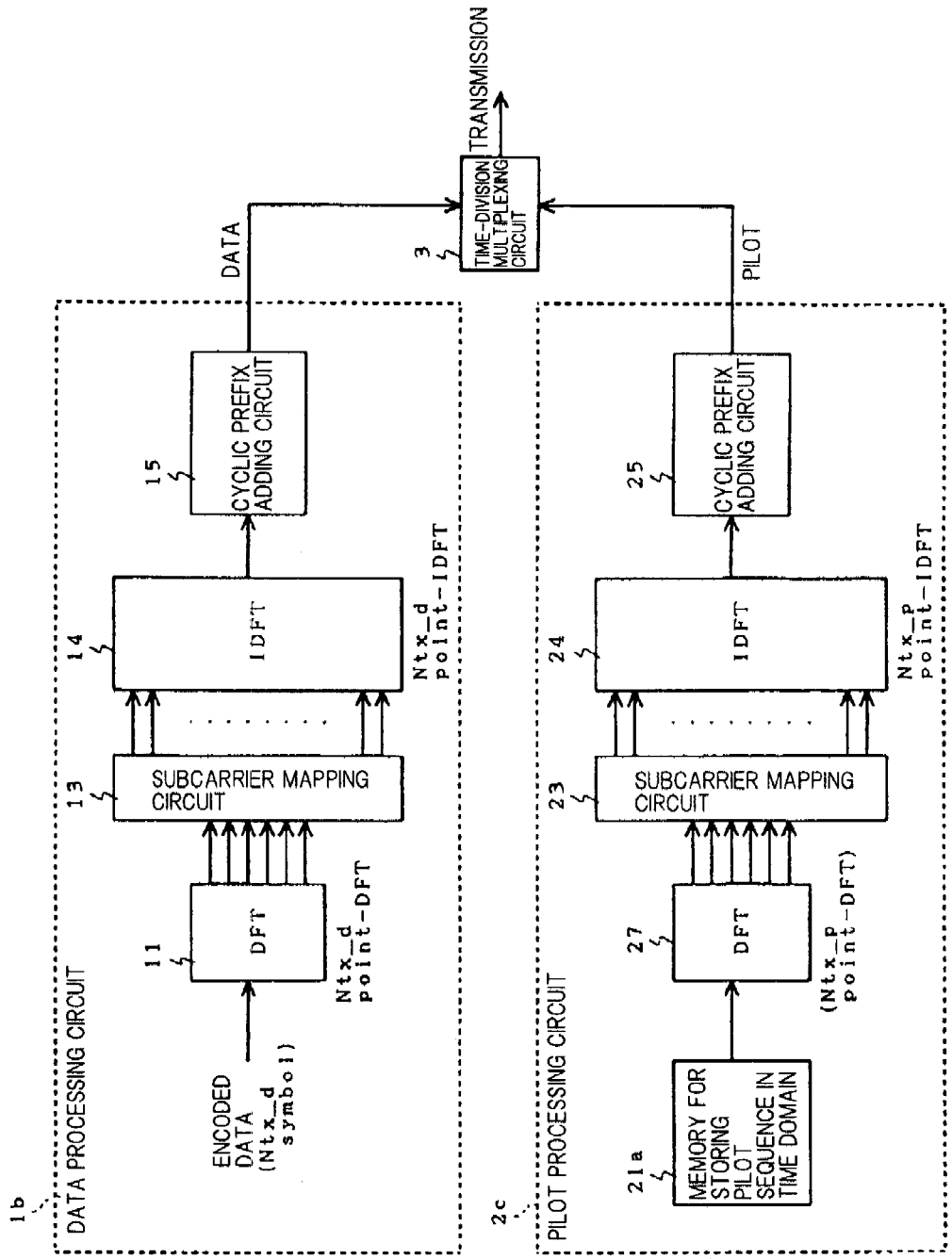
FIG. 23 is a block diagram showing the configuration of a transmitter according to a fifth exemplary embodiment of the present invention.
Figure 24:
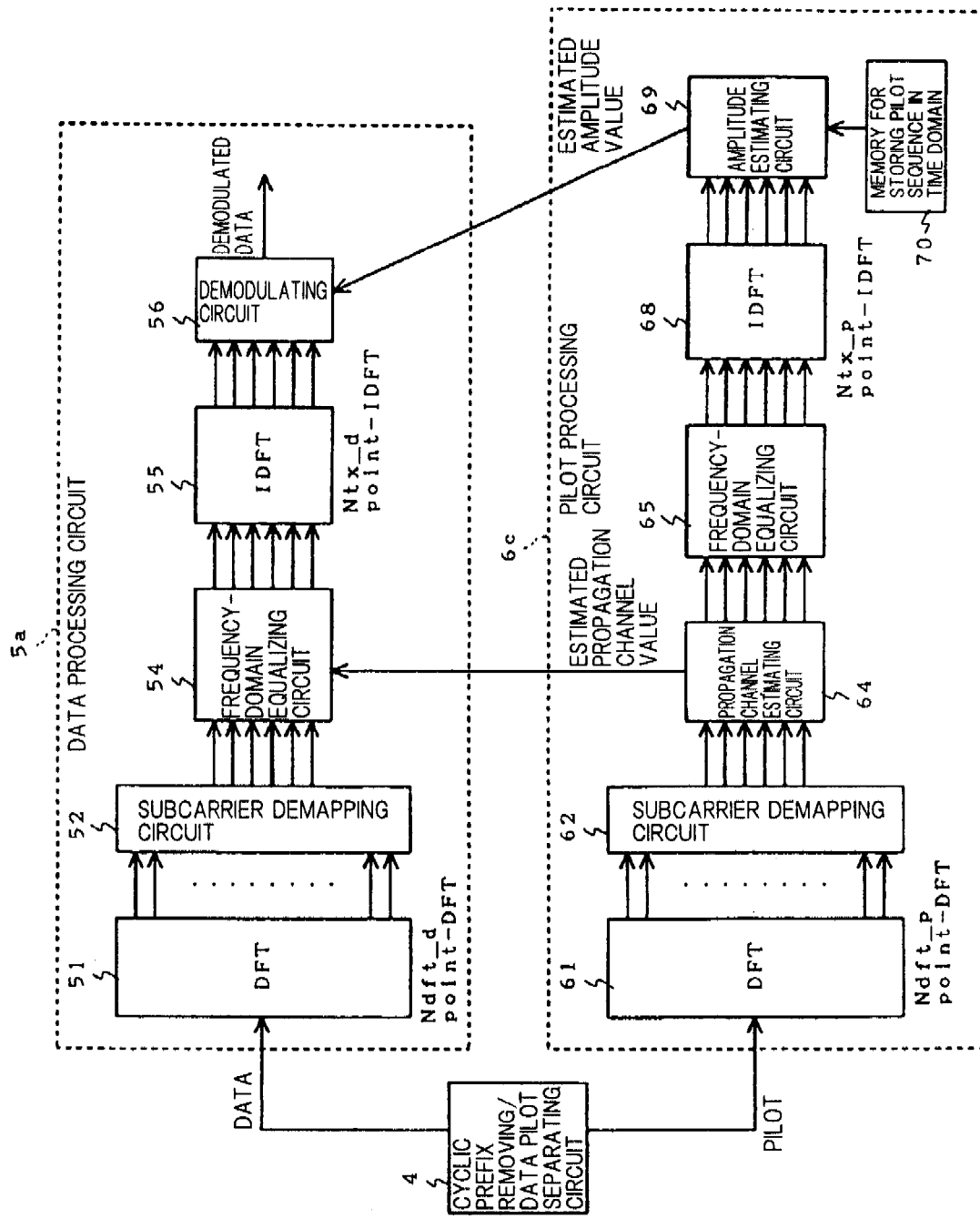
FIG. 24 is a block diagram showing the configuration of a receiver according to the fifth exemplary embodiment of the present invention.

FIG. 23 is a block diagram showing the configuration of a transmitter according to a fifth exemplary embodiment of the present invention, and FIG. 24 is a block diagram showing the configuration of a receiver according to the fifth exemplary embodiment of the present invention.

The transmitter and the receiver according to the fifth exemplary embodiment are different from the transmitter and the receiver according to the background art shown in FIGS. 7 and 8 in that the roll-off filters are dispensed with, and memories for storing a pilot sequence in the time domain are added.

As shown in FIG. 23, the transmitter according to the fifth exemplary embodiment comprises data processing circuit 1b, pilot processing circuit 2c, and time-division multiplexing circuit 3. Data processing circuit 1b comprises a data encoding circuit, not shown, DFT circuit 11, subcarrier mapping circuit 13, IDFT circuit 14, and cyclic prefix adding circuit 15. Pilot processing circuit 2c comprises memory 21a for storing a pilot sequence in the time domain, subcarrier mapping circuit 23, IDFT circuit 24, and cyclic prefix adding circuit 25.

As shown in FIG. 24, the receiver according to the fifth exemplary embodiment comprises the cyclic prefix removing/data pilot separating circuit 4, data processing circuit 5a, and pilot processing circuit 6c. Data processing circuit 5a comprises DFT circuit 51, subcarrier demapping circuit 52, frequency-domain equalizing circuit 54, IDFT circuit 55, and demodulating circuit 56. Pilot processing circuit 6b comprises DFT circuit 61, subcarrier demapping circuit 62, propagation channel estimating circuit 64, frequency-domain equalizing circuit 65, IDFT circuit 68, amplitude estimating circuit 69, and memory 70 for storing a pilot sequence in the time domain.

In the fifth exemplary embodiment, a circuit for calculating a pilot sequence according to an equation representing a time-domain pilot sequence may be provided instead of the memory for storing a pilot sequence in the time domain. Operation of the transmitter and the receiver according to the fifth exemplary embodiment is the same as the operation of the transmitter and the receiver according to the first exemplary embodiment except that pilot processing circuits 2c, 6c have DFT circuits 27, 61, and will not be described below.

In the present exemplary embodiment, the configuration which does not need to reduce the amount of DFT computations is illustrated, and the DFTed Zadoff-Chu sequence may be held or may not be held. In the present exemplary embodiment, furthermore, a pilot block size is selected by the same process as the method of selecting a pilot block size according to the fourth exemplary embodiment, and the same advantages as those of the fourth exemplary embodiment are obtained except that the amount of DFT computations is reduced.

The transmitter according to the present exemplary embodiment may include, in addition to the above components, the pilot block size selecting apparatus illustrated in the fourth exemplary embodiment. The transmitter according to the present exemplary embodiment may also include a memory for holding a table representing the association between data block sizes and pilot block sizes. The pilot signal may also be referred to as a reference signal.

6th Exemplary Embodiment

A sixth exemplary embodiment will be described below.

Zadoff-Chu (see Non-patent Document 1) sequences according to the equations (7) and (8) shown below are assumed to be a reference signal for UETRA uplinks. L represents a sequence length.

[Equation 7]

L:even (7)

$$P_k = (a_k(0), a_k(1), \ldots, a_k(L-1)),$$

$$a_k(n) = \exp\left(-j2\pi k \frac{n^2/2}{L}\right), (n = 0, 1, \ldots, L-1)$$

-continued

[Equation 8]

L:odd  (8)

$$P_k = (a_k(0), a_k(1), \ldots, a_k(L-1)),$$

$$a_k(n) = \exp\left(-j2\pi k \frac{n(n+1)/2}{L}\right), (n = 0, 1, \ldots, L-1)$$

A reference block size may be of a multiple of 6 or 12 as representing a short block or a long block. A Zadoff-Chu sequence length is selected to fit the reference block size. According to one method of selecting a Zadoff-Chu sequence length, a length shorter than the reference block size or a length equal to the reference block size is selected. In this case, as shown in FIGS. 25(a), (b), the Zadoff-Chu sequence itself or the Zadoff-Chu sequence to which a cyclic copy of first N (=reference signal block size–L) symbols is added is used.

Figure 25:
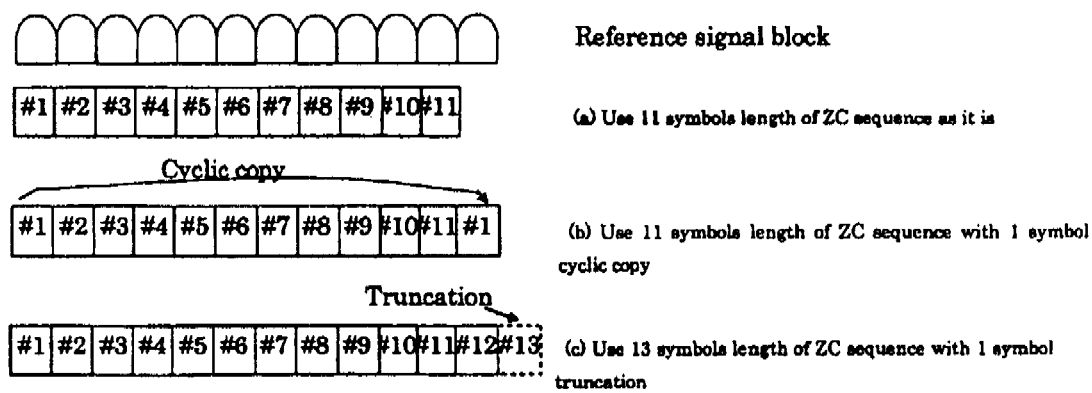
FIG. 25 is a diagram showing an example of a method of selecting a Zadoff-Chu sequence length according to a sixth exemplary embodiment of the present invention.

According to another method, as shown in FIG. 25(c), a truncated Zadoff-Chu sequence length longer than the reference block size is selected (Non-patent Document 6: R1-063057, "EUTRA SC-FDMA Uplink Pilot/Reference Signal Design" Motorola).

In order to maximize the number of sequences that can be used, it is preferable to select a prime number as representing a Zadoff-Chu sequence length. However, the limitation requiring a prime number to be selected of necessity is too strict because if the number of resource blocks assigned to one user is large, the difference between the reference block size and the Zadoff-Chu sequence length may become large. For example, if the reference block size is equal to 120, then prime numbers closest to 120 are 113 and 127. For 113, the number of sequences that can be used is 112, and the cross-correlation is $1/\sqrt{113}$ or smaller. For 127, the number of sequences that can be used is 126, and the cross-correlation is $1/\sqrt{127}$ or smaller. However, the difference between the reference block size and the Zadoff-Chu sequence length is 7. If this difference is large, the channel estimation is degraded for FIG. 25(a), and the autocorrelation and the cross-correlation are degraded or the PAPR increases for FIGS. 25(b), (c). Therefore, there are desired good criteria for determining a Zadoff-Chu sequence length.

For reducing the difference between the reference block size and the Zadoff-Chu sequence length, the following criteria are proposed: These criteria serve to select a sequence length for keeping large the number of reference sequences that can be used and have a good cross-correlation property.

Option 1: To select a number including a large maximum prime factor; and

Option 2: To select a number including a large maximum prime factor and a small number of prime factors.

The reasons for using these criteria are as follows:

The cross-correlation between a sequence $c_k(n)$ and a sequence $c_{k'}(n)$ is expressed by the following equation (9):

[Equation 9]

$$R_{[c_k(n),c_{k'}(n)]} = \begin{cases} 0; & \text{for } m \text{ is NOT multiple of } g, \\ \sqrt{g}/\sqrt{L}; & \text{for } m \text{ is multiple of } g, \text{ where } g \text{ is g.c.d. of } (k-k') \& L. \end{cases} \quad (9)$$

If the greatest common divisor (g) between (k–k') and L becomes smaller, the cross-correlation becomes better.

Assuming that the maximum prime factor of L is $L_i$, if k and k' are smaller than $L_i$, then g is smaller than $L_i$. This means that the number of sequences wherein the cross-correlation is equal to or smaller than $1/\sqrt{L_i}$ increases. This is the reason for Option 1. It should be noted that if k and k' are smaller than $L_i$, then as the number of prime factors increases the number of sequences that can be used decreases.

It is assumed that the reference block size is 120. For example, 118 (59×2) is not a prime number, but includes a large prime factor 59. In this case, k and k' of sequences that can be used are indicated by the following equation (10):

$$k,k' \{1,3,5,7,9,11,13,15,17,19,57,61,\ldots,115,117\} \quad (10)$$

Since k and k' need to be relatively prime with respect to L, multiples of 2 or 59 are excluded. The number of codes that can be used is 57. Since all k and k' are odd numbers and k–k' is an even number at all times, the cross-correlation is equal to or smaller than $1/\sqrt{59}$ in all sequences.

In this example, the number of reference sequences that can be used and have a good cross-correlation property is kept large, and the difference between the reference signal block size and the Zadoff-Chu sequence length is reduced from 7 to 2.

In the above example, all the sequences have a good cross-correlation property. If k and k' are smaller than the maximum prime factor, then they are true at all times. However, k and k' which are greater than the maximum prime factor are not true at all times. Now, 177 (=59×3) will be considered. In this case, k and k' of sequences that can be used are indicated by the following equation (11):

$$k,k' = \{1,2,4,5,7,8,10,11,13,14,58,61,62,64,\ldots,175,176\} \quad (11)$$

Since k–k' is relatively prime with respect to 59 for k and k' that are smaller than 59, the cross-correlation is equal to or smaller than $1/\sqrt{59}$. For k and k' that are greater than 59, not all sequences satisfy such a status. For example, as 3 is excluded from k and k' that can be used, 62 satisfies the status. However, since (61–2) and (64–5) are 59, 61 and 64 do not satisfy the above status.

It is possible to look for all sequences having a good cross-correlation property with respect to various reference block sizes. However, the process becomes complex if the number of prime factors grows.

A simpler method is to use Option 2 as a criterion. A good cross-correlation property ($\leq 1/\sqrt{L_i}$) is obtained for at least k and k' that are smaller than the maximum prime factor. As the number of prime factors decreases, the number of usable k and k' that are smaller than the maximum prime factor increases.

In the sixth exemplary embodiment, the criteria for determining a Zadoff-Chu sequence length has been proposed. It has also been shown that the proposed criteria can keep large the number of reference sequences that can be used and have a good cross-correlation property, and can reduce the difference between the reference signal block size and the Zadoff-Chu sequence length.

The invention claimed is:

1. A wireless communication system comprising:
a mobile station comprising a transmitter which transmits a data signal and a pilot signal; and
a base station comprising a receiver which demodulates the data signal based on the pilot signal,
wherein the transmitter calculates a sequence of the pilot signal in a frequency domain according to a present numerical formula and a Zadoff-Chu sequence, wherein the length of the Zadoff-Chu sequence is a largest prime number among at least one prime number which is less than the length of the pilot signal.

2. The wireless communication system according to claim 1, wherein the transmitter is configured to set the sequence of the pilot signal and a sequence of the data signal.

3. The wireless communication system according to claim 1, wherein the mobile station communicates with the base station via a single carrier.

4. The wireless communication system according to claim 1, wherein said preset numerical formula includes the mod operator.

5. A transmitter in a wireless communication system, the transmitter comprising:
   a transmitting circuit which transmits a data signal and a pilot signal;
   a processing circuit which calculates a sequence of the pilot signal in a frequency domain according to a present numerical formula and a Zadoff-Chu sequence, wherein the length of the Zadoff-Chu sequence is a largest prime number among at least one prime number which is less than the length of the pilot signal.

6. The transmitter according to claim 5, wherein the processing circuit is configured to set the sequence of the pilot signal and a sequence of the data signal.

7. The transmitter according to claim 5, wherein the transmitter communicates with a receiver via a single carrier.

8. A communication control method in a transmitter in a wireless communication system, the method comprising:
   transmitting a data signal and a pilot signal;
   calculating a sequence of the pilot signal in a frequency domain according to a preset numerical formula and a Zadoff-Chu sequence, wherein the length of the Zadoff-Chu sequence is a largest prime number among at least one prime number which is less than the length of the pilot signal.

9. The communication control method according to claim 8, further comprising:
   setting the sequence of the pilot signal and a sequence of the data signal.

10. The communication control method according to claim 8 wherein the transmitter communicates with the receiver via a single carrier.

* * * * *

UNITED STATES PATENT AND TRADEMARK OFFICE
CERTIFICATE OF CORRECTION

PATENT NO. : 8,548,008 B2  
APPLICATION NO. : 12/278694  
DATED : October 1, 2013  
INVENTOR(S) : Oketani et al.

Page 1 of 1

It is certified that error appears in the above-identified patent and that said Letters Patent is hereby corrected as shown below:

In the Specification

Column 2, Line 16: after "Ntx_p" insert -- = --  
Column 15, Line 4: delete "=61 × 30 α × × (1+0.22)" and insert -- =61 × 30 α × (1+0.22) --  
Column 20, Line 13: after "size" insert -- = --  
Column 20, Line 18: delete "factor≥a" and insert -- factor≥α --  
Column 20, Line 42: delete "'5" and insert -- "5 --  
Column 20, Line 53: delete "=10-1" and insert -- $=10^{-1}$ --  
Column 20, Line 57: delete "=10-1" and insert -- $=10^{-1}$ --  
Column 21, Line 43: delete "(19□5)," and insert -- (=19□5), --  
Column 21, Line 43: delete "(17∞7)," and insert -- (17□7), --  
Column 22, Line 56: delete "UETRA" and insert -- E-UTRA --

Signed and Sealed this  
Ninth Day of September, 2014

Michelle K. Lee  
*Deputy Director of the United States Patent and Trademark Office*